US012665715B2

(12) United States Patent
Abasi et al.

(10) Patent No.: US 12,665,715 B2
(45) Date of Patent: Jun. 23, 2026

(54) FEDERATED LEARNING SYSTEM AND METHOD WITH ADAPTIVE NOISE AND DIFFERENTIAL PRIVACY

(71) Applicant: Mohamed bin Zayed University of Artificial Intelligence, Abu Dhabi (AE)

(72) Inventors: Ammar Kamal Abasi, Abu Dhabi (AE); Moayad Aloqaily, Abu Dhabi (AE); Mohsen Guizani, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 358 days.

(21) Appl. No.: 18/544,556

(22) Filed: Dec. 19, 2023

(65) Prior Publication Data

US 2025/0119251 A1 Apr. 10, 2025

Related U.S. Application Data

(60) Provisional application No. 63/587,866, filed on Oct. 4, 2023.

(51) Int. Cl.
| | |
|---|---|
| *H04L 5/00* | (2006.01) |
| *H04B 7/06* | (2006.01) |

(Continued)

(52) U.S. Cl.
CPC ......... *H04L 5/0048* (2013.01); *H04B 7/0617* (2013.01); *H04L 41/16* (2013.01); *H04W 12/02* (2013.01)

(58) Field of Classification Search
CPC ..... H04L 5/0048; H04L 41/16; H04B 7/0617; H04W 12/02
See application file for complete search history.

(56) References Cited

U.S. PATENT DOCUMENTS

2023/0084883 A1* 3/2023 Pezeshki ............... H04W 48/02
                                                      370/329
2024/0152649 A1* 5/2024 Kao .................... G06F 21/6245

FOREIGN PATENT DOCUMENTS

CN       115936109 A     4/2023
CN       116567824 A     8/2023
              (Continued)

OTHER PUBLICATIONS

Podschwadt et al. ; A Survey of Deep Learning Architectures for Privacy-Preserving Machine Learning With Fully Homomorphic Encryption ; IEEEAccess ; Nov. 10, 2022 ; 24 Pages.

*Primary Examiner* — Kyaw Z Soe
(74) *Attorney, Agent, or Firm* — Oblon, McClelland, Maier & Neustadt, L.L.P.

(57) ABSTRACT

A wireless communication network method and system that includes a central server, cellular base stations, edge computing devices, and client devices. The client devices send uplink pilot sequences, which are collected and aggregated by the base stations. The base stations then relay this aggregated pilot data to the central server. The central server deploys network weights for a global deep learning neural network model to the base stations for incorporation into respective local deep learning models, trained to predict optimal beamforming vectors, to the base stations for incorporation into respective local deep learning model. During training the central server integrates adaptive noise into weights received for each of the local deep learning models.

13 Claims, 23 Drawing Sheets

(51) Int. Cl.
    *H04L 41/16*         (2022.01)
    *H04W 12/02*      (2009.01)

(56)                 References Cited

FOREIGN PATENT DOCUMENTS

| WO | 2021/123139 | A1 | 6/2021 |
| WO | 2023/096214 | A1 | 6/2023 |

\* cited by examiner

Undefended-NAN-FL

Defended-AN-FL

Undefended-NAN-FL

Deep Learning Dataset Size (Thousand Samples)

◇ Genie-aided Coordinated Beamforming     ▽ ε=0.40

○ ε=0.10                                   ⬠ ε=0.50

○ ε=0.20                                   □ Baseline Coordinated Beamforming

△ ε=0.30                                   ▨ Unsuccessful Attack

Defended-AN-FL

Deep Learning Dataset Size (Thousand Samples)

◊ Genie-aided Coordinated Beamforming     ▽ ε=0.40
○ ε=0.10                                   ⌂ ε=0.50
○ ε=0.20                                   □ Baseline Coordinated Beamforming
△ ε=0.30                                   ▨ Unsuccessful Attack Defended-AN-FL Undefended-NAN-FL Deep Learning Dataset Size (Thousand Samples)

◊ Genie-aided Coordinated Beamforming     ▽ ε=0.40
○ ε=0.10                                    ⬠ ε=0.50
○ ε=0.20                                    □ Baseline Coordinated Beamforming
△ ε=0.30                                    ▨ Unsuccessful Attack Defended-AN-FL

FEDERATED LEARNING SYSTEM AND METHOD WITH ADAPTIVE NOISE AND DIFFERENTIAL PRIVACY

CROSS-REFERENCE TO RELATED APPLICATIONS

This application claims the benefit of priority to provisional application No. 63/587,866 filed Oct. 4, 2023, the entire contents of which are incorporated herein by reference.

BACKGROUND

Technical Field

The present disclosure is directed to a system and method of federated learning that enhances user privacy and data security for data used in machine learning in the context of wireless networks, in particular in 6G cellular networks, preferably using adaptive noise and differential privacy.

Description of Related Art

The next frontier in wireless connectivity, referred to as 6G cellular communication, is expected to deliver astonishing speeds of 1 terabit-per-second (Tbps). To accomplish such speeds, the 6G cellular network uses millimeter wave (mmWave) communication. Millimeter wave communication is foreseen as a solution to trends in rapid traffic growth in large cities and social life hotspots. Millimeter wave communication offers particular benefits in settings involving massive multiple-input multiple-output (MIMO) and high mobility in a limited indoor or outdoor space. However, high data rates in a limited space are especially vulnerable to adversarial attacks that gain access to user sensitive data. Artificial Intelligence (AI) can be used to solve problems associated with millimeter wave communication, including beamforming. However, neural network models are vulnerable to attacks, referred to as Fast Gradient Sign Method (FGSM), which combines a white box approach with a misclassification goal. A FGSM attack tricks a neural network model into making wrong predictions.

Cellular networks have evolved rapidly over the past few decades, progressing from the First Generation (1G) to the Fifth Generation (5G), offering increasingly higher data speeds and reduced latency. See A. Devrari, A. Kumar, and P. Kuchhal, "Global aspects and overview of 5g multimedia communication," *Multimedia Tools and Applications*, pp. 1-46, 2023. The advent of 5G has marked a significant milestone by providing up to 20 times faster speeds than its predecessor, Fourth Generation (4G), through innovative technologies like massive multiple-input multiple-output (MIMO) and beamforming. See M. R. Dakkak, D. G. Riviello, A. Guidotti, and A. Vanelli-Coralli, "Evaluation of multi-user multiple-input multiple-output digital beamforming algorithms in b5g/6g low earth orbit satellite systems," *International Journal of Satellite Communications and Networking*, 2023; and A. K. Abasi, M. Aloqaily, B. Ouni, M. Guizani, M. Debbah, and F. Karray, "A survey on securing 6g wireless communications based optimization techniques," in 2023 *International Wireless Communications and Mobile Computing (IWCMC)*. IEEE, 2023, pp. 216-223. However, research endeavors have already commenced in anticipation of the Sixth Generation (6G) cellular network by the 2030s, the next frontier in wireless connectivity, expected to deliver astonishing speeds of 1 terabit-persecond (Tbps). See M. Banafaa, I. Shayea, J. Din, M. H. Azmi, A. Alashbi, Y. I. Daradkeh, and A. Alhammadi, "6g mobile communication technology: Requirements, targets, applications, challenges, advantages, and opportunities," *Alexandria Engineering Journal*, 2022; and M. Banafaa, I. Shayea, J. Din, M. H. Azmi, A. Alashbi, Y. I. Daradkeh, and A. Alhammadi, "6G mobile communication technology: Requirements, targets, applications, challenges, advantages, and opportunities," *Alexandria Engineering Journal*, vol. 64, pp. 245-274, 2023.

Among the pivotal technologies primed to play a pivotal role in 6G is millimeter wave (mmWave) communication, operating in the 30-100 GHz range. See Q. Xue, C. Ji, S. Ma, J. Guo, Y. Xu, Q. Chen, and W. Zhang, "A survey of beam management for mmwave and thz communications towards 6g," *arXiv preprint arXiv:2308.02135*, 2023. In contrast to the sub-6 GHz frequencies employed in 5G, mmWave boasts significantly greater bandwidth, enabling ultra-high data rates. See N. Rajatheva, I. Atzeni, E. Bjornson, A. Bourdoux, S. Buzzi, J.-B. Dore, S. Erkucuk, M. Fuentes, K. Guan, Y. Hu et al., "White paper on broadband connectivity in 6g," *arXiv preprint arXiv:2004.14247*, 2020. Fully harnessing the potential of mmWave in 6G hinges upon surmounting considerable challenges, chief among them being the establishment and maintenance of highly directional links between base stations (BSs) and mobile users. See L.-H. Shen, K.-T. Feng, and L. Hanzo, "Five facets of 6g: Research challenges and opportunities," *ACM Computing Surveys*, vol. 55, no. 11, pp. 1-39, 2023. This demands precise beam prediction to determine the optimal beam alignment given the directional characteristics of mmWave propagation. See A. Alkhateeb, S. Alex, P. Varkey, Y. Li, Q. Qu, and D. Tujkovic, "Deep learning coordinated beamforming for highly-mobile millimeter wave systems," *IEEE Access*, vol. 6, pp. 37 328-37 348, 2018.

An innovative solution that combines Machine Learning (ML) with coordinated beamforming addresses the significant challenges associated with supporting high mobility in mmWave systems, particularly in the context of applications like vehicular communications and wireless virtual/augmented reality. The approach involves multiple distributed BSs serving a mobile user, with the user transmitting a single uplink training pilot sequence received by the coordinating BSs using omni or quasi-omni beam patterns. These received signals provide valuable information about the user's location and interaction with the environment. A Deep Learning (DL) model is then employed to predict the optimal beamforming vectors at the BSs, resulting in a comprehensive solution that offers reliable coverage, low latency, and minimal training overhead for highly mobile mmWave applications. Extensive simulations utilizing accurate ray tracing demonstrate that the proposed DL-coordinated beamforming approach achieves impressive data rate gains compared to traditional methods, especially in high-mobility scenarios with large antenna arrays. Furthermore, the results underscore the adaptability of the DL model to changing environments and dispel the need for phase synchronization among coordinated BSs, paving the way for future research such as multi-user systems, time-varying scenarios, and more advanced ML models for mmWave beamforming.

One of the key advantages of using ML in mmWave beam prediction is its ability to adapt to real-world channel measurements. In traditional methods, predicting beamforming vectors relies on predefined mathematical models and environmental assumptions. However, these models may only sometimes accurately represent the dynamic and complex nature of mmWave channels, especially in scenarios with rapid wireless device mobility and varying communication obstacles and barriers.

ML, on the other hand, leverages historical data collected from actual channel measurements to make predictions. This approach allows the model to capture subtle patterns and variations in the mmWave channel, which might be explicitly challenging to model. By doing so, ML can offer more accurate and robust beam predictions, enhancing the overall performance of mmWave communication systems.

However, integrating ML into 6G mmWave systems raises essential security concerns. Some of these concerns are thoroughly investigated and discussed. See E. Catak, F. O. Catak, and A. Moldsvor, "Adversarial machine learning security problems for 6g: mmwave beam prediction usecase," in 2021 *IEEE International Black Sea Conference on Communications and Networking (BlackSeaCom)*. IEEE, 2021, pp. 1-6, incorporated herein by reference in its entirety. It is important to recognize that as ML models rely on data, the privacy of user information becomes an issue. The data used for training these models can potentially contain sensitive information about users, and ensuring the privacy and security of this data are needed.

The potential security vulnerabilities of ML models in communications systems have been recognized as an essential research area. Adversarial attacks against ML models for mmWave beam prediction in 6G networks have been investigated. See F. O. Catak, M. Kuzlu, E. Catak, U. Cali, and D. Unal, "Security concerns on machine learning solutions for 6g networks in mmwave beam prediction," *Physical Communication*, vol. 52, p. 101626, 2022, incorporated herein by reference in its entirety. It was demonstrated that DL models for beam prediction are at risk of being manipulated by adversarial examples to produce faulty results. However, it was also proposed an adversarial training approach as a mitigation method. Through iterative retraining of the model using perturbed examples, it was shown that this defensive technique could make the model more robust against attacks while maintaining prediction accuracy comparable to the original undefended model. An optimization framework for DL hyperparameters to enhance security through beam prediction in 6G mmWave networks has been proposed. See A. K. Abasi, M. Aloqaily, M. Guizani, and M. Debbaht, "Mitigating security risks in 6g networks-based optimization of deep learning," in *GLOBECOM 2023-2023 IEEE Global Communications Conference*. IEEE, 2023, pp. 1-6, incorporated herein by reference in its entirety. The approach uses hybrid Particle Swarm Optimization (PSO) and Multi-Verse Optimizer (MVO) to build a robust DL model that adapts to adversarial attacks while maintaining high prediction accuracy. Simulations show the optimized model's effectiveness, achieving low mean squared error (MSE) even under Fast Gradient Sign Method (FGSM) adversarial attacks. In contrast, the non-optimized model struggles.

To address the privacy issue in ML, Federated Learning (FL) can be a promising solution. FL allows ML models to be trained collaboratively across many devices and sensors without centralizing the data in one location. See S. Sai, V. Hassija, V. Chamola, and M. Guizani, "Federated learning and nft-based privacy-preserving medical data sharing scheme for intelligent diagnosis in smart healthcare," *IEEE Internet of Things Journal*, 2023, incorporated herein by reference in its entirety. This decentralized approach enhances privacy by keeping sensitive user data on the individual clients (i.e., devices) while still improving model performance through collective learning. By leveraging the computational power of various devices and sensors in the training process, FL not only enhances privacy but also contributes to the overall robustness and efficiency of ML models in the context of 6G mmWave systems.

A concern of user data privacy takes center stage in the context of wireless networks, with its importance magnified in 6G, where data rates are poised to soar to unprecedented levels. See D. P. M. Osorio, I. Ahmad, J. D. V. S'anchez, A. Gurtov, J. Schaolliers, M. Kutila, and P. Porambage, "Towards 6g-enabled internet of vehicles: Security and privacy," *IEEE Open Journal of the Communications Society*, vol. 3, pp. 82-105, 2022; S. Chen, Y.-C. Liang, S. Sun, S. Kang, W. Cheng, and M. Peng, "Vision, requirements, and technology trend of 6g: How to tackle the challenges of system coverage, capacity, user data-rate and movement speed," *IEEE Wireless Communications*, vol. 27, no. 2, pp. 218-228, 2020; and H. H. H. Mahmoud, A. A. Amer, and T. Ismail, "6g: A comprehensive survey on technologies, applications, challenges, and research problems," *Transactions on Emerging Telecommunications Technologies*, vol. 32, no. 4, p. e4233, 2021.

Accordingly, it is one object of the present disclosure to provide methods and systems that safeguard user privacy and data security, harnessing the power of federated learning. The federated learning training process distributes the machine learning model across user devices to ensure the localization of sensitive user data and obviate the need to transmit them to a central server for model updates. Another object of the present disclosure is to provide a decentralized approach that augments privacy protection and contributes to the reduction of communication overhead associated with centralized model training, while ensuring security of user data.

SUMMARY

An aspect is a wireless communication network system, the system can include aa central server (S); a plurality of cellular base stations (BSs); a plurality of edge computing devices (Es) in communication with sets of one or more BSs; and a plurality of client devices (Cs) in communication with one or more BSs, wherein the client devices (Cs) are configured to send uplink pilot sequences, which are collected and aggregated by the BSs to provide aggregated pilot data, wherein the plurality of BSs predict beamforming vectors based on the aggregated pilot data, wherein the central server is configured with a global deep learning (DL) neural network model for prediction of optimal beamforming vectors, wherein the central server is configured to deploy network weights for the global deep learning (DL) neural network model to the plurality of Es for incorporation into a respective plurality of local DL models, and wherein, during training the central server integrates adaptive noise into network weights received for each of the plurality of local DL models.

A further aspect is a method of wireless communication in a wireless communication network system, the system can include a plurality of cellular base stations (BSs), a plurality of processing circuitry devices in communication with sets of one or more BSs, and a plurality of client devices (Cs) in communication with one or more BSs, the method can include sending, by the client devices (Cs) and the base stations (BSs), communication beamforming data between the BSs and the Cs; collecting and aggregating, by the plurality of processing circuitry devices, the communication beamforming data into aggregated communication beamforming data for communication between particular ones of the client devices (Cs) and the base stations (BSs); training, by each of the plurality of processing circuitry devices, a plurality of local deep learning (DL) models using the aggregated communication beamforming data; sharing updated weights of the plurality of local DL models with a central server; integrating, by the central server, adoptive noise into updated weights for each of the local DL models to obtain respective local model noisy weights; aggregating, by the central server, the respective local model noisy weights to enhance weights for a global deep learning (DL) neural network model; and deploying, by the central server, the enhanced weights for the global deep learning (DL) neural network model to the plurality of processing circuitry devices for incorporation into respective local DL models, wherein the global deep learning (DL) neural network model is configured to predict optimal beamforming vectors.

A further aspect is a non-transitory computer-readable storage medium including computer executable instructions, wherein the instructions, when executed by a plurality of processing circuitry devices, cause the processing circuitry devices to perform a method of federated learning in a wireless communication network system, comprising a plurality of cellular base stations (BSs), the processing circuitry devices in communication with sets of one or more BSs, and a plurality of client devices (Cs) in communication with one or more BSs, the method can include sending, by the client devices (Cs) and the base stations (BSs), communication beamforming data between the BSs and the Cs; collecting and aggregating, by the plurality of processing circuitry devices, the communication beamforming data into aggregated communication beamforming data for communication between particular ones of the client devices (Cs) and the base stations (BSs); training, by each of the plurality of processing circuitry devices, a plurality of local deep learning (DL) models using the aggregated communication beamforming data; sharing updated weights of the plurality of local DL models with a central processing circuitry device; integrating, by the central processing circuitry device, adaptive noise into updated weights for each of the local DL models to obtain respective local model noisy weights; aggregating, by the central processing circuitry device, the respective local model noisy weights to enhance weights for a global deep learning (DL) neural network model; and deploying, by the central processing circuitry device, the enhanced weights for the global deep learning (DL) neural network model to the plurality of processing circuitry devices for incorporation into respective local DL models, wherein the global deep learning (DL) neural network model is configured to predict optimal beamforming vectors.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
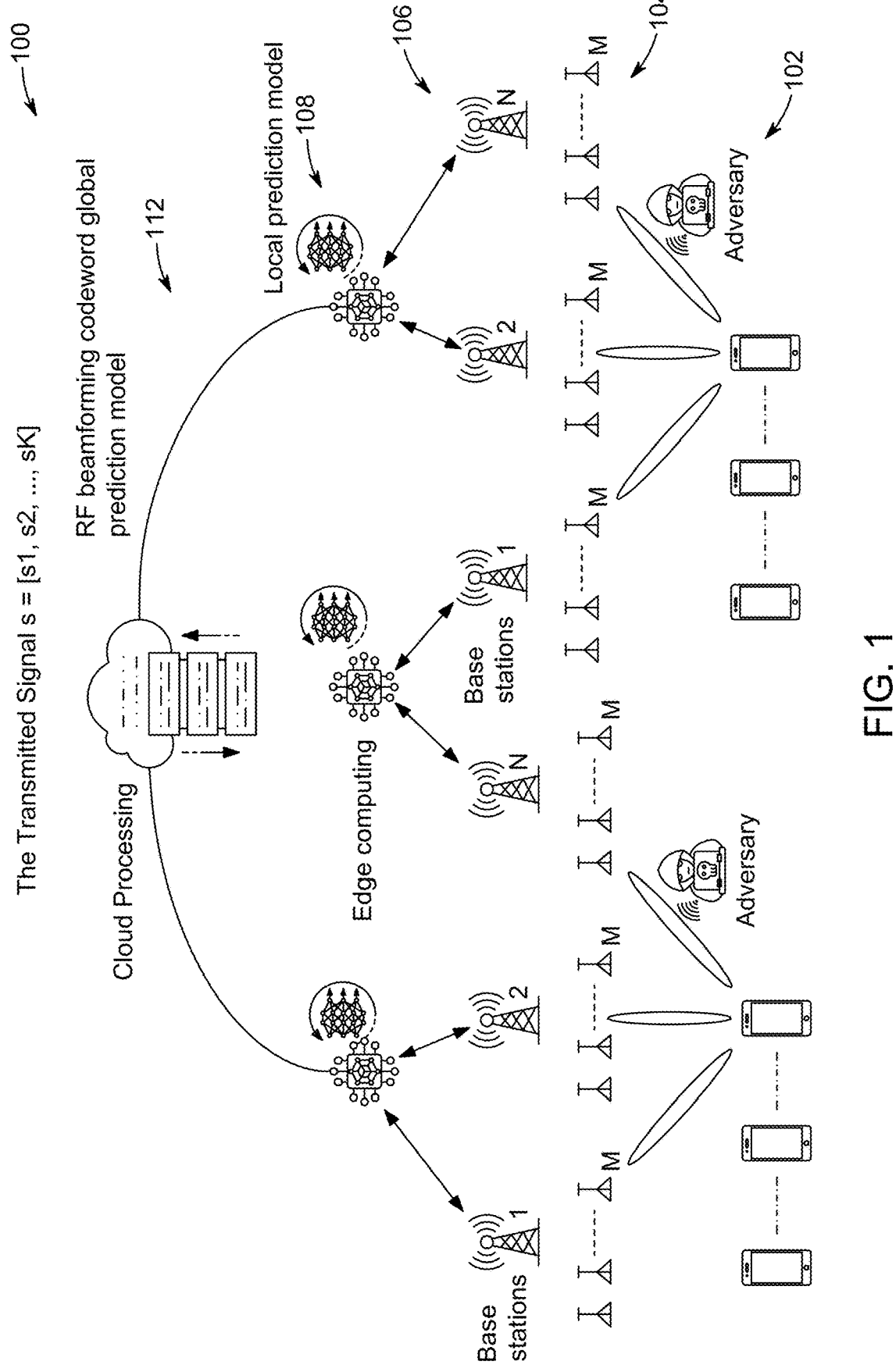
FIG. 1 is a federated learning system for mmWave beam prediction, in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Embodiments include an approach to address the pressing security concerns in ML solutions for 6G networks, explicitly focusing on mmWave beam prediction. In response to the paramount importance of user data privacy, Embodiments employ FL to decentralize model training, ensuring that sensitive user information remains securely localized on individual devices. Moreover, recognizing the imperative need for resilience against adversarial attacks, the embodiments integrate adaptive noise into model weights to create a robust defense mechanism. By continuously adapting to evolving threat landscapes, the ML model demonstrates exceptional resilience against FGSM adversarial attacks and similar threats, thus fortifying the security of mmWave beam prediction in the imminent era of 6G wireless connectivity. The effectiveness of the approach is demonstrated in safeguarding user privacy and enhancing the overall security of 6G networks.

Aspects of this disclosure are directed to a system and method of FL as a robust solution for preserving user data privacy in mmWave beam prediction for 6G networks. This decentralized training approach ensures that sensitive user information remains localized on individual devices, enhancing privacy and reducing the need for centralized data storage.

The resilience of mmWave beam prediction models against adversarial attacks, including the FGSM, is strengthened when adaptive noise is incorporated into model weights. The continued effectiveness of the model in the face of evolving security threats is ensured by the dynamic noise adaptation mechanism.

Further, an aspect is a system and method of integration of mmWave beam prediction, FL, and adversarial defense using DL, make significant progress in achieving secure and privacy-aware ML for 6G.

Extensive experiments validate the beam prediction accuracy and evaluate the FL method in four diverse outdoor and indoor scenarios. The models demonstrate an ability to generalize well across different environments.

A. FL for Millimeter-Wave Beam Prediction

FL can address privacy concerns regarding user data in the context of mmWave beam prediction within wireless networks. FL can facilitate collaborative machine ML model training by utilizing decentralized data stored on edge devices, all while ensuring data localization.

FIG. 1 is a federated learning system for mmWave beam prediction. The FL system 100 contains four components: a central server (S) 112, multiple cellular BSs (BS$_i$) 106, edge computing devices (E$_i$) 108, and numerous client devices (C) 102. A goal is to employ FL to train and improve a global ML model for mmWave beam prediction across these components while preserving user data privacy and minimizing communication overhead.

5G cellular communication introduced the concept of edge computing into the cellular communication system. Applications such are virtual reality, factories of the future or autonomous driving, are very demanding in terms of the propagation's/network's response time. To reduce this time, some local replications of a main server are introduced closer to the end-user. These local replications are referred to as edge computing devices. An aspect of edge computing is to bring computational power as physically close to the end user device as possible.

For purposes of this disclosure, edge computing may be implemented in any of smartphones, tablet computers, computing devices associated with and connected to a base station, or local edge computing devices in a region.

Specifically, each client device C, 102 collects channel state information (CSI) data during mmWave beam scanning and communication. The edge devices (E$_i$) 108 associated with BSs (BS$_i$) aggregate the CSI from local clients to train initial local models $$\left( M_i^{local} \right).$$

The central server (S) 112 then coordinates the model training across edge devices using FL. See A. K. Abasi, M. Aloqaily, B. Ouni, and M. Hamdi, "Optimization of cnn-based federated learning for cyber-physical detection," in 2023 *IEEE 20th Consumer Communications & Networking Conference (CCNC)*. IEEE, 2023, pp. 1-6, incorporated herein by reference in its entirety, as an example of FL in the case of cyber-physical detection. In each round of FL, the central server 112 sends the current global model (M$_{global}$) to the edge devices 108. The edge devices 108 train the global model on their local CSI data and send model updates ($\Delta M_i$) back without sharing the raw CSI. This preserves data privacy as sensitive CSI is not exposed to outside local devices and edge devices. The central server 112 aggregates these local model updates using Federated Averaging (Fe-dAvg) to improve the global model. The aggregation process can be represented by Eq. (1):

$$M_{global}^{(t+1)} = \frac{1}{N} \sum_{i=1}^{N} \frac{|\mathcal{D}_i|}{|\mathcal{D}|} \Delta M_i^{(t)} \tag{1}$$

Where $$M_{global}^t$$

is the global model at round t, N is the number of edge devices, $\mathcal{D}_i$ is the local dataset of edge device E$_i$, $\mathcal{D}$ is the union of all local datasets, and $$\Delta M_i^t$$

is the model update from edge device E$_i$ 108.

The updated global model is shared again with edge devices 108 to continue model training collaboratively. This global model can then be used for mmWave beam prediction to improve communication performance while keeping user data decentralized and private.

In the context of this wireless network scenario, FL provides several compelling advantages. Since raw data remains on devices, FL ensures data privacy and security, making it suitable for applications with sensitive information. FL minimizes the need for transmitting large datasets to a central server, reducing communication costs and latency. The collaborative approach enables the creation of a more accurate global model, thereby improving model quality, by leveraging diverse local datasets and training models close to where data are generated. Beyond sharing model updates, FL enables the creation of a comprehensive model by aggregating data from diverse environments, including indoor and outdoor settings, resulting in a more robust and adaptable model.

B. Using ML Models to Estimate RF Beamforming Vectors

Radio Frequency (RF) beamforming is a crucial technique in wireless communications that enables efficient use of available spectrum and enhances signal quality by adjusting antenna elements to focus the radiation pattern. See C. Zhang, L. Chen, L. Zhang, Y. Huang, and W. Zhang, "Incremental collaborative beam alignment for millimeter wave cell-free mimo systems," *IEEE Transactions on Communications,* 2023, incorporated herein by reference in its entirety. RF beamforming is a technique that focuses a wireless signal towards a receiving device. A beamforming technique is to form a targeted beam using multiple antennas in close proximity in order to broadcast the same signal at slightly different times. The overlapping waves will produce interference, some of which are constructive and some of which are destructive. The beamforming technique results in focusing a signal to a specific direction.

Traditionally, estimating RF beamforming vectors relies on mathematical models and algorithms. However, with the widespread adoption of massive MIMO systems, new challenges have emerged, especially in channel training and beamforming. See V. Kadam, A. Deshmukh, and S. Bhosale, "Hybrid beamforming for dual functioning multi-input multi-output radar using dimension reduced-baseband piecewise successive approximation," *International Journal of Engineering*, vol. 36, no. 1, pp. 182-190, 2023, incorporated herein by reference in its entirety. Conventional methods using closed-form equations to find optimal vectors become increasingly difficult due to dynamic environmental factors like user and Base Station (BS) locations, furnishings, and other obstacles. Recent advancements in ML now offer an innovative approach to efficiently estimate RF beamforming vectors by harnessing the power of DL algorithms. In contrast to relying solely on mathematical models, DL algorithms can account for intricate environmental factors and dynamically update beamforming vectors for massive MIMO systems with greater accuracy and efficiency.

The success of this DL-based technique depends on creating an appropriate deep neural network (DNN) architecture and the availability of sufficiently large uplink training datasets. See W. Kim, Y. Ahn, J. Kim, and B. Shim, "Towards deep learning-aided wireless channel estimation and channel state information feedback for 6g," *Journal of Communications and Networks*, vol. 25, no. 1, pp. 61-75, 2023, incorporated herein by reference in its entirety. The network architecture must balance model complexity, training time, and prediction accuracy. Meanwhile, the training datasets should capture many real-world conditions under which the beamforming vectors must be estimated. See S. Tang, Y. Zhang, J. Rao, Z. Han, C.-Y. Chiu, and R. Murch, "Beam-forming network design utilizing node microstrip architectures for dual-polarized endfire millimeter-wave antenna arrays," *IEEE Transactions on Antennas and Propagation*, 2023; and M. Mohsin, J. M. Batalla, E. Pallis, G. Mastorakis, E. K. Markakis, and C. X. Mavromoustakis, "On analyzing beamforming implementation in o-ran 5g," *Electronics*, vol. 10, no. 17, p. 2162, 2021, each incorporated herein by reference in their entirety.

The DL-based solution outlined in the present disclosure provides an improvement over conventional DL algorithms. The DL-based solution consists of two primary phases: the training and prediction phases. These phases involve using initial uplink pilot signals, specifically omni-received pilot signals, transmitted from the clients. In telecommunications, a pilot signal is a signal transmitted over a communications system for supervisory, control, equalization, continuity, synchronization, or reference purposes.

The DL-based solution harnesses these pilot signals to learn and predict the best RF beamforming vectors for the given environment and system parameters. By leveraging large amounts of pilot data, the DL model can capture intricate real-world dynamics and radio propagation characteristics to optimize the beamforming vectors in a highly efficient manner.

1) Training Phase: The training phase is an integral part of the system where channel estimation and precoding vector determination take place. During this phase, clients located within the coverage area of multiple BSs transmit uplink training pilot sequences for each beam coherence time ($T_B$). The beam coherence time represents the average duration over which the beam alignments remain stable.

The BSs receive and combine these pilot signals to extract information about the optimal RF beamforming vectors. Pilot signaling plays a crucial role as it enables accurate channel estimation.

A DL algorithm is employed at the edge device to process the pilot sequence data received from all the clients. The objective of the DL algorithm is to maximize the achievable rate ($R(p)_n$) of the system as defined in Eq. (2). This rate function calculates the achievable throughput based on parameters like Signal-to-Noise Ratio (SNR), channel coefficients between users and BSs ($h_{k,n}$), and subcarriers.

The channel coefficient for omni-directional beams is represented by $g_p$, while $h_{k,n}$, signifies the channel coefficient for the $n^{th}$ BS at the $k^{th}$ subcarrier. The DL algorithm determines the optimal precoding vectors to maximize the system throughput by optimizing these channel coefficients using the received pilot signals as input.

$$R(p)_n = \arg\max_{1 \le n \le K} \sum_{n=1}^{N} \log_2\left(1 + SNR \cdot |h_{k,n}g_p|^2\right) \tag{2}$$

Where:

$g_p$ represents the channel coefficient for omni-beams, $h_{k,n}$, signifies the channel coefficient for the nth BS at the $k_{th}$ subcarrier.

The uplink pilot sequences are transmitted to the cloud (central server) during the prediction phase. The process involves users sending uplink pilot sequences, which are then combined by the base stations (BSs) and sent to the cloud. The cloud, in turn, uses a trained deep learning (DL) model to predict the best radio frequency (RF) beamforming vectors for each BS to maximize the achievable rate. This prediction is based on the aggregated pilot signals received from the users. Finally, the predicted RF beamforming vectors are used by the BSs to estimate the effective channel. The Online FL Phase (FIG. 2A), the training phase, stops once a certain number of rounds are finished. The training phase involves the DL model training its neural network using signals received by omni and codeword beams within a Federated Learning (FL) environment, involving edge computing devices and a cloud server.

The DL Prediction Phase (FIG. 2B) begins after completing the Online FL Phase (training phase). The trained model predicts the Base Station (BS) Radio Frequency (RF) beamforming vectors in this phase. The prediction phase specifically utilizes the signals received by the omni beam. Therefore, the transition from the training phase to the prediction phase occurs once the specified number of rounds in the Online FL Phase is completed. It is noted that in the prediction phase, edge devices will not be directly involved in the real-time prediction or decision-making processes, and their role is limited to data collection and occasional model updates during retraining phases.

2) Prediction Phase: Following the training phase, the prediction phase is initiated to determine the optimal RF beamforming vectors. See T. Zhao, C. Luo, J. Zhou, D. Guo, N. Chen, and P. Casaseca-de-la Higuera, "DOA prediction based beamforming with low training overhead for highly-mobile UAV communication with cellular networks," *Applied Sciences*, vol. 10, no. 13, p. 4420, 2020, incorporated herein by reference in their entirety. In this phase, users first send uplink pilot sequences, which are collected and aggregated by the nearby BSs. The BSs then relay this aggregated pilot data to the cloud-based processing unit.

The cloud system deploys the global DL model trained in the previous phase. The main objective of the prediction phase is to leverage this model to determine the best RF beamforming vectors for precoding (beamforming) at each BS. The DL model aims to maximize the achievable downlink data rate for every BS by optimizing its beamforming vectors.

The predicted RF beamforming vectors are crucial in enabling adaptive beamforming at the BSs. This beamforming adaptation enhances the performance of massive MIMO systems by focusing transmission and reception beams towards desired user devices (client devices). It helps mitigate interference and improves the signal reception quality at the user devices (client devices).

Ultimately, the beamforming vector prediction done by the cloud-based DL model contributes to improved overall system reliability. Ensuring stronger signal reception and reduced interference enhances the throughput and coverage of wireless networks employing massive MIMO technology. This completes the RF beam prediction using the cloud-edge framework.

C. Adversarial Examples and the Fast Gradient Sign Method (FGSM)

Adversarial ML explores interactions between ML algorithms and malicious inputs crafted to degrade performance or induce misclassifications. This area of research is essential for improving the robustness and security of deployed AI systems. See L. Caviglione, C. Comito, M. Guarascio, and G. Manco, "Emerging challenges and perspectives in deep learning model security: A brief survey," *Systems and Soft Computing*, p. 200050, 2023, incorporated herein by reference in its entirety.

The Fast Gradient Sign Method (FGSM) is an attack mechanism that generates adversarial examples efficiently. FGSM exploits the gradient of the loss function concerning the original input to construct adversarial perturbations. See W. Wang, C. Zhou, D. Lin, and Y.-G. Wang, "Fecondefense: Reversing adversarial attacks via feature consistency loss," *Computer Communications*, 2023, incorporated herein by reference in its entirety. Initially:

x=original input sample (e.g. the pilot sequence data.)
y=true class label of x
θ=parameters of target model being attacked
l(θ, x, y)=loss function used for model training (e.g. cross-entropy)

FGSM works by taking a single step toward the gradient's sign from the original input. This operation can be represented by Eq. (3).

$$x_{adv} = x + \epsilon * \text{sign}(\nabla_x \ell(\theta, x, y)) \tag{3}$$

Where $\epsilon$ is a small constant that controls the perturbation magnitude, intuitively, the sign of the gradient indicates the direction that most increase loss—FGSM exploits this to generate adversarial examples at low computational cost. Typical values of $\epsilon$ are small fractions of the total input range, e.g. 0.10.

While fast, FGSM perturbations may not always be imperceptible. Later attacks optimize adversarial noise under perceptual constraints. Nonetheless, FGSM has demonstrated an urgent need to evaluate model robustness against adversarial threats, spurring much ongoing research at the intersection of ML and security.

D. Federated Learning with Differential Privacy,

Differential privacy is a framework that introduces controlled noise into data to protect individual privacy during statistical analyses. See W. Liu, J. Cheng, X. Wang, X. Lu, and J. Yin, "Hybrid differential privacy based federated learning for internet of things," *Journal of Systems Architecture*, vol. 124, p. 102418, 2022, incorporated herein by reference in its entirety. This approach prevents any singular data point from being discerned, ensuring the privacy of clients. See X. Wu, Y. Zhang, M. Shi, P. Li, R. Li, and N. N. Xiong, "An adaptive federated learning scheme with differential privacy preserving," *Future Generation Computer Systems*, vol. 127, pp. 362-372, 2022, incorporated herein by reference in its entirety. In FL, differential privacy is crucial to preserve client data privacy while achieving practical model training. See K. Wei, J. Li, C. Ma, M. Ding, W. Chen, J. Wu, M. Tao, and H. V. Poor, "Personalized federated learning with differential privacy and convergence guarantee," *IEEE Transactions on Information Forensics and Security*, 2023, incorporated herein by reference in its entirety.

The Gaussian Mechanism is a widely used approach in FL to achieve differential privacy. This mechanism thoughtfully introduces noise to the data to guarantee their inscrutability, thereby safeguarding individual client identities. See R. Ramakrishna, A. Scaglione, T. Wu, N. Ravi, and S. Peisert, "Differential privacy for class-based data: A practical gaussian mechanism," *IEEE Transactions on Information Forensics and Security*, 2023, incorporated herein by reference in its entirety. Another technique, the Laplace Mechanism, adds noise to the data with high certainty, ensuring that no individual client can be accurately traced. See F. Dong, X. Ge, Q. Li, J. Zhang, D. Shen, S. Liu, X. Liu, G. Li, F. Wu, and J. Luo, "Padp-fedmeta: A personalized and adaptive differentially private federated meta learning mechanism for aiot," *Journal of Systems Architecture*, vol. 134, p. 102754, 2023, incorporated herein by reference in its entirety.

To further improve the efficiency and effectiveness of differential privacy in FL, several techniques can be used. Gradient Perturbation introduces noise to the gradients of model updates instead of perturbing the raw data. This approach can effectively reduce the amount of noise required to attain a specific level of privacy, making the overall process more efficient. See, D. Yu, H. Zhang, W. Chen, T.-Y. Liu, and J. Yin, "Gradient perturbation is underrated for differentially private convex optimization," *arXiv preprint arXiv:1911.11363*, 2019, incorporated herein by reference in its entirety.

Randomized Projection is a technique that maps the data onto a lower-dimensional space using random projections. This process reduces the dimensionality of the data, thereby decreasing the noise level necessary to maintain privacy while preserving the data's utility. See P. Li and X. Li, "Differential privacy with random projections and sign random projections," *arXiv preprint arXiv:2306.01751*, 2023, incorporated herein by reference in its entirety.

Multi-Party Computation is a technique in which data are divided into smaller, manageable pieces, and these fragments are processed separately on different devices. This division minimizes the noise required to maintain privacy, as only a fraction of the data are exposed at any time. This approach also distributes trust and responsibility across multiple parties, bolstering security. See Q. Yang, A. Huang, L. Fan, C. S. Chan, J. H. Lim, K. W. Ng, D. S. Ong, and B. Li, "Federated learning with privacy-preserving and model ip-right-protection," *Machine Intelligence Research*, vol. 20, no. 1, pp. 19-37, 2023, incorporated herein by reference in its entirety.

In FL, the "privacy budget" concept is important. See J. Yang, S. Chen, G. Wang, Z. Wang, Z. Jie, and M. Arif, "Gflaldpa: a gradient compression federated learning framework based on adaptive local differential privacy budget allocation," *Multimedia Tools and Applications*, pp. 1-20, 2023, incorporated herein by reference in its entirety. This budget dictates the total amount of noise that can be added to the data while maintaining the desired privacy level. See L. Zhang, J. Xu, A. Sivaraman, J. Deborah, P. K. Sharma, and V. Pandi, "A two-stage differential privacy scheme for federated learning based on edge intelligence," *IEEE Journal of Biomedical and Health Informatics*, 2023, incorporated herein by reference in its entirety. Each time noise is introduced, such as through gradient perturbation or randomized projection, it consumes a portion of this budget. Thus, understanding and meticulously managing the privacy budget is critical to ensure that the FL system consistently provides the expected level of privacy throughout its operation.

As the privacy budget diminishes with each operation, balancing privacy preservation and model utility is crucial. Overspending the privacy budget may lead to overly noisy models with reduced predictive power, while underutilizing the budget could compromise the privacy guarantees of the system. See J. Li, G. Liao, L. Chen, and X. Chen, "Roulette: A semantic privacy-preserving device-edge collaborative inference framework for deep learning classification tasks," *IEEE Transactions on Mobile Computing*, 2023, incorporated herein by reference in its entirety.

One strategy to address this challenge is adaptive privacy budget allocation. See J. Yang et al.; and L. Chen, D. Yue, X. Ding, Z. Wang, K.-K. R. Choo, and H. Jin, "Differentially private deep learning with dynamic privacy budget allocation and adaptive optimization," *IEEE Transactions on Information Forensics and Security*, 2023, each incorporated herein by reference in their entirety. By dynamically allocating the privacy budget based on the sensitivity of the data or the specific operation being performed, FL systems can maximize privacy protection while minimizing the impact on model performance.

It has been determined that continuous monitoring and auditing of the privacy budget can help maintain transparency and accountability in FL systems. Embodiments include tracking the privacy budget consumption and ensuring the overall privacy in order to guarantee that the privacy budget remains within acceptable bounds.

System Model

FL represents a cutting-edge ML paradigm where a model is trained across numerous decentralized edge devices or servers, each housing local data samples without data exchange among them. This approach holds significant promise for future 6G networks, as it empowers the provision of intelligent services at the network's edge. However, the deployment of FL in 6G networks introduces a novel set of challenges, particularly its susceptibility to adversarial attacks.

Figure 2A:
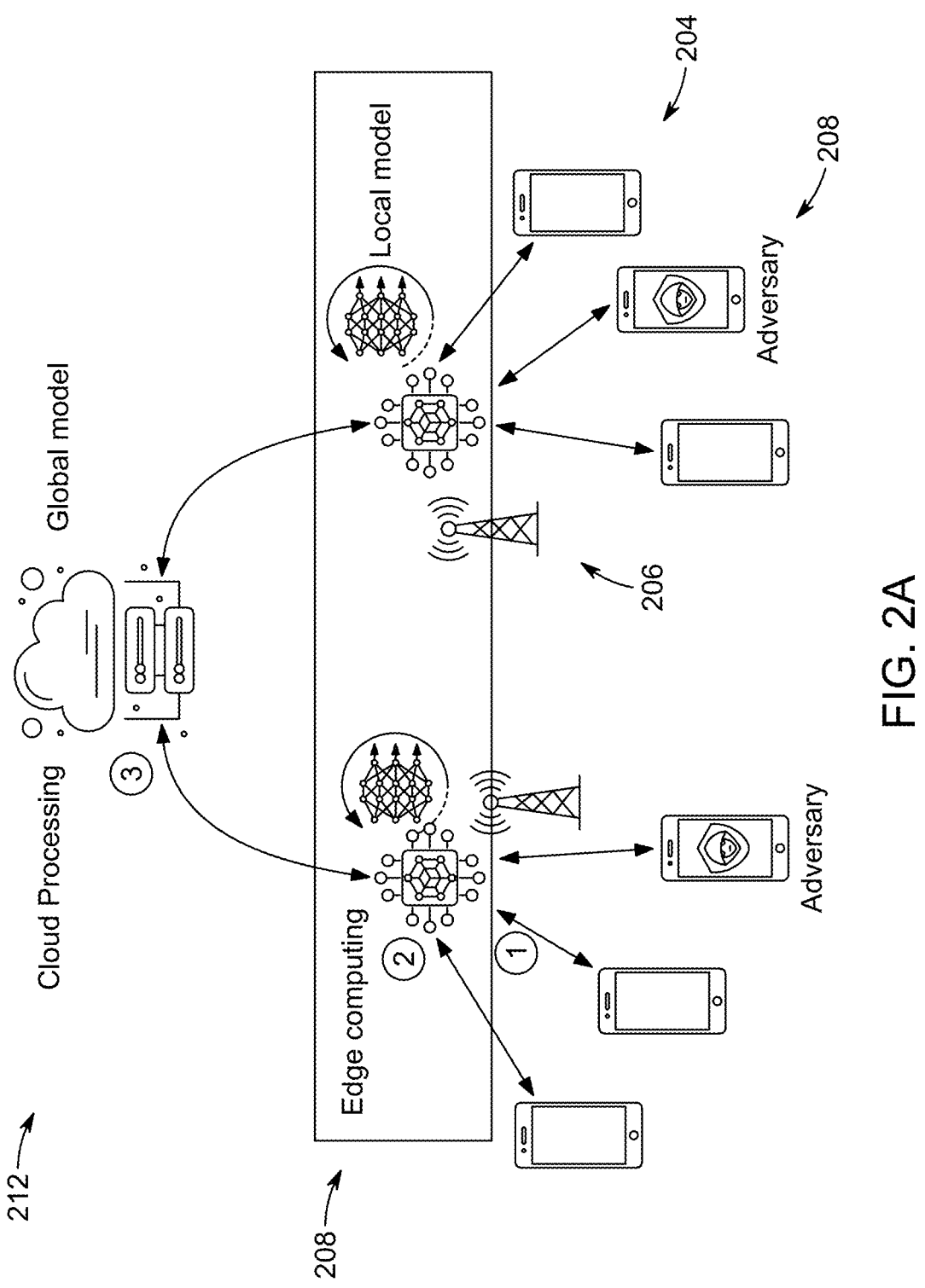
FIG. 2A is flow diagram of an online federated learning method in edge computing devices, in accordance with an exemplary aspect of the disclosure.
Figure 2B:
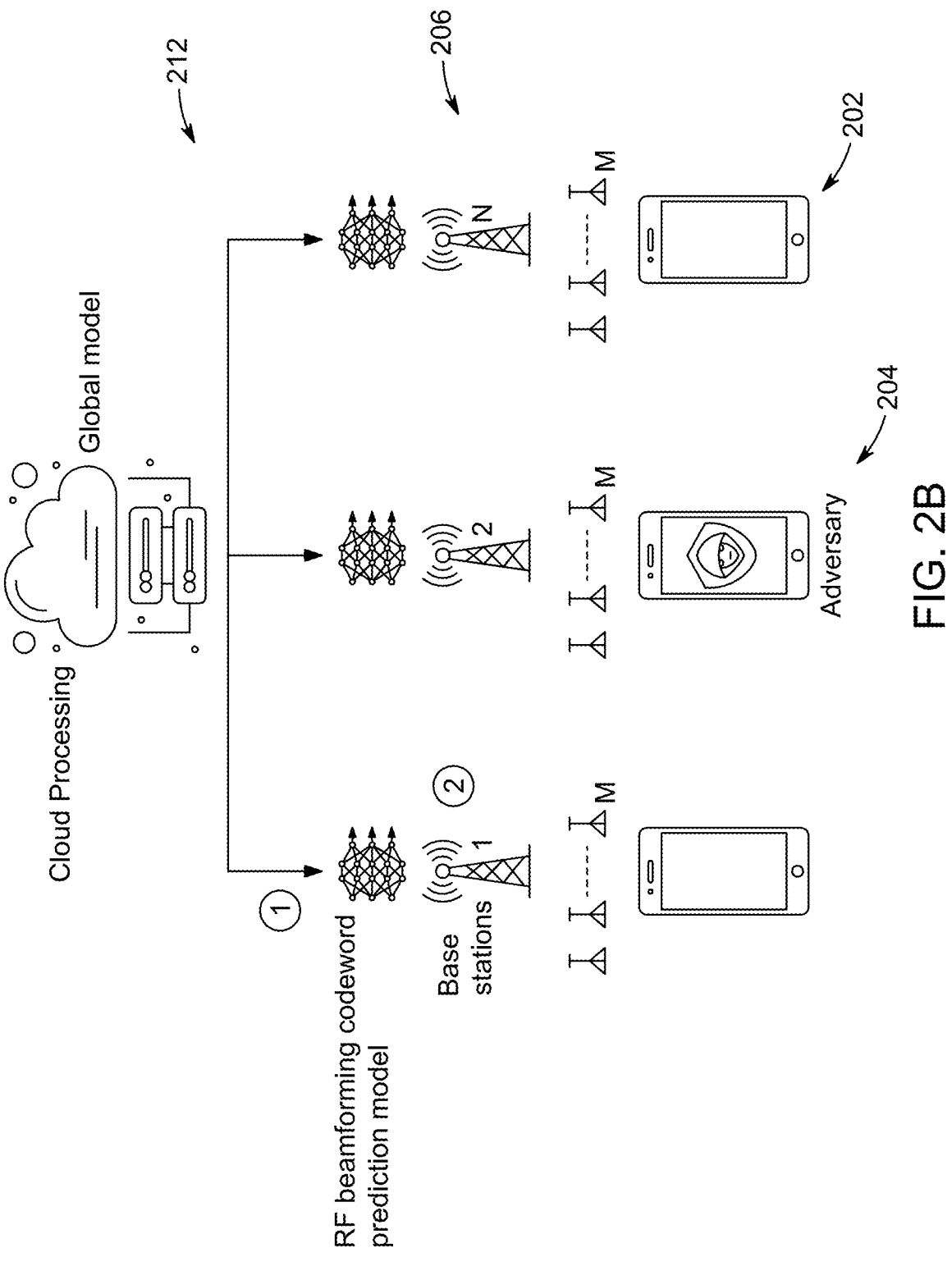
FIG. 2B is a flow diagram of a deep learning prediction method for predicting the base station RF beamforming vectors, in accordance with an exemplary aspect of the disclosure.

FIG. 2A is flow diagram of an online federated learning method in edge computing devices, in accordance with an exemplary aspect of the disclosure, FIG. 2B is a flow diagram of a deep learning prediction method for predicting the base station RF beamforming vectors. These figures elucidate the pivotal role of FL in 6G networks and serve as reference points for a subsequent embodiment in FIG. 4.

A. Modified FGSM Attack and its Impact on FL in 6G Networks

FL in 6G networks introduces a decentralized approach to training ML models across a massive number of distributed clients 202, edge devices 208, and BSs 206 with mmWave communication capabilities. In an embodiment, a massive number of clients can include on the order of several hundred thousand clients. These BSs utilize beamforming techniques to control wavefront directions by adjusting antenna magnitudes and phases. Unlike traditional centralized processing, FL leverages local processing on these BSs 206, which reduces complexity and communication overhead while maintaining privacy.

Each BS 206 with a single RF chain actively participates in model training in this FL environment. The architecture, as illustrated in FIG. 2A, showcases a network of BSs 206 where N represents the number of BSs serving a mobile user 202 equipped with a single antenna. It is noted that base stations are not used as hosts for local training models. The global beamforming prediction models are hosted in the base stations. Edge devices serve a role as hosts for local training models due to the resource limitations of the base stations.

The decentralized setup allows each BS 206 to perform local computations and contribute to model updates. Centralized/cloud processing 212, as mentioned in the previous context, is no longer necessary for FL.

Regarding FIG. 2B, during the DL Prediction Phase, the model predicts the BS RF beamforming vectors solely utilizing the signals received by the omni beam from client devices 202.

The FL process collaboratively entails training a global model, where each BS 206 computes model weight updates based on local data. These weight updates are aggregated at the cloud processor 212 to produce an improved global model. However, the security of FL systems is of utmost importance, as they are susceptible to adversarial attacks.

The modified FGSM attack, initially designed for real-number-based classification models, needs to be adapted to accommodate the typical data complex number of mmWave communication systems. This adaptation becomes crucial in the context of FL in 6G networks, where models operate on complex-valued data. Algorithm 1 outlines the modified FGSM attack for FL, with considerations for complex numbers.

---

Algorithm 1: Algorithm for FGSM (complex numbers based)

---

Require: $x \in \mathbb{C}^m$, $y \in \mathbb{R}^n$, F, $\epsilon$, $\alpha$
1:   /* Convert $\epsilon \in$ R from the real number domain to $\epsilon_{complex} \in \mathbb{C}$ in the complex domain, where $\mathrm{Re}(\epsilon_{complex}) = \epsilon$ and $\mathrm{Im}(\epsilon_{complex}) = \epsilon$ */
2:   $\epsilon_{complex} \leftarrow (\epsilon + \epsilon \cdot j)$
3:   $x_0 \leftarrow x$
4:   $n \leftarrow 0$
5:   while n < N do
6:      /* Update x using the loss direction */
7:      $x(t + 1) = \mathrm{clip}_{x,\epsilon} (x_t + \epsilon_{complex} \cdot \mathrm{sign}(\nabla_x \mathcal{L}(x_t, F, y))$
8:      if distance Euclidian$(F(x_{t+1}) - y) \geq \alpha$ then
9:         /* If the distance between the manipulated input's prediction and the real output is greater than $\alpha$ */
10:     end while
11:    end if
12:  end while
13:  return $x_{t+1}$ {output}

---

In FL, the attack on the local models at individual edge devices can have detrimental effects on the global model's performance. Adversarial perturbations applied during the training process could mislead the collaborative global model towards making incorrect decisions or predictions. Therefore, securing FL in 6G networks against such attacks is an ongoing challenge. The application of a modified FGSM attack is a significant feature. Within this context, the dynamics of received and transmitted signals are expressed as shown in Eq. (4), which delineates the received signal at the k th subcarrier:

$$y_k = \sum_{n=1}^{N} h_{k,n}^T x_{k,n} + v_k \tag{4}$$

where $y_k$ signifies the downlink received signal at the kth subcarrier, with $h_{k,n}$ representing the channel vector linking the nth base station (BS) to the user client device, T represents the transpose operation, $x_{k,n}$ denoting the transmitted complex baseband signal from the kth subcarrier to the nth BS, and $v_k$ accounting for additive white Gaussian noise (AWGN) with variance $\sigma^2$. Equation 5 characterizes the transmitted signal as:

$$x_{k,n} = f_n c_{k,n} s_k \tag{5}$$

Within this equation, $x_{k,n}$ encapsulates the transmitted signal from the kth subcarrier of the client device to the nth BS. Meanwhile, $f_n$ signifies the beam steering vector utilized for analog beamforming, $c_{k,n}$ represents the code vector applied at each subcarrier on each BS, and $s_k$ denotes the data symbol for the kth subcarrier.

The calculation of the achievable rate in the network is detailed in Eq. 6:

$$R_{eff} = \left(1 - \frac{TTR}{TB}\right) \sum_{k=1}^{K} \log_2 \left(1 + SNR \left|\sum_{n=1}^{N} h_{k,n}^T, f_n c_{k,n}\right|^2\right) \tag{6}$$

Within this equation, $R_{eff}$ signifies the effective achievable rate in the network. TTR represents the initial training time in the context of beam coherence time TB, K signifies the number of subcarriers, and SNR quantifies the signal-to-noise ratio. The variable $h_{Tk,n}$ is indicative of the channel vector at time $T_k$ between the nth BS and the user channel device.

These equations are preferred to improve the performance of communication systems within the 6G network paradigm. Their elucidation underscores the role played by the modified FGSM attack and its adaptation to complex-number-based FL in ensuring the security and resilience of ML models within 6G communication systems. Safeguarding FL processes against adversarial attacks is important in upholding the reliability and precision of global models, all trained in a decentralized and privacy-preserving manner.

B. Capability of the Attacker

In the context of FL, an attacker operating in a white-box setting possesses a unique advantage and enhanced capabilities compared to other settings. In this first type of scenario, the attacker (204) has extensive knowledge about the FL system, including the model architecture, training process, and access to model updates and gradients. This privileged information empowers the attacker (204) to exploit vulnerabilities and manipulate the federated model while minimizing the risk of detection. The primary objective of the attacker 204 in this setting is often to manipulate the model by introducing strategic noise into the input data.

In a second type of scenario, in the case of RF beamforming codeword prediction models, attackers can simi-larly exploit vulnerabilities within these models, potentially causing disruptions or unauthorized access to wireless communication systems. These models are responsible for optimizing signal transmission and reception by predicting the optimal codewords to adjust antenna elements. Attackers may employ various techniques, such as data poisoning attacks, adversarial attacks, and model evasion, to compromise the integrity and functionality of the RF beamforming model.

These two scenarios share common elements, as both attackers 204 leverage their deep knowledge of the models and systems they target. In the white-box FL scenario, attackers 204 can access the model's architecture and gradients, allowing them to craft precise attacks and adapt strategies in real time. Similarly, in the context of the RF beamforming codeword prediction model scenario, attackers 204 may exploit weaknesses by injecting malicious data, employing adversarial tactics, or manipulating the model during training.

Figure 3:
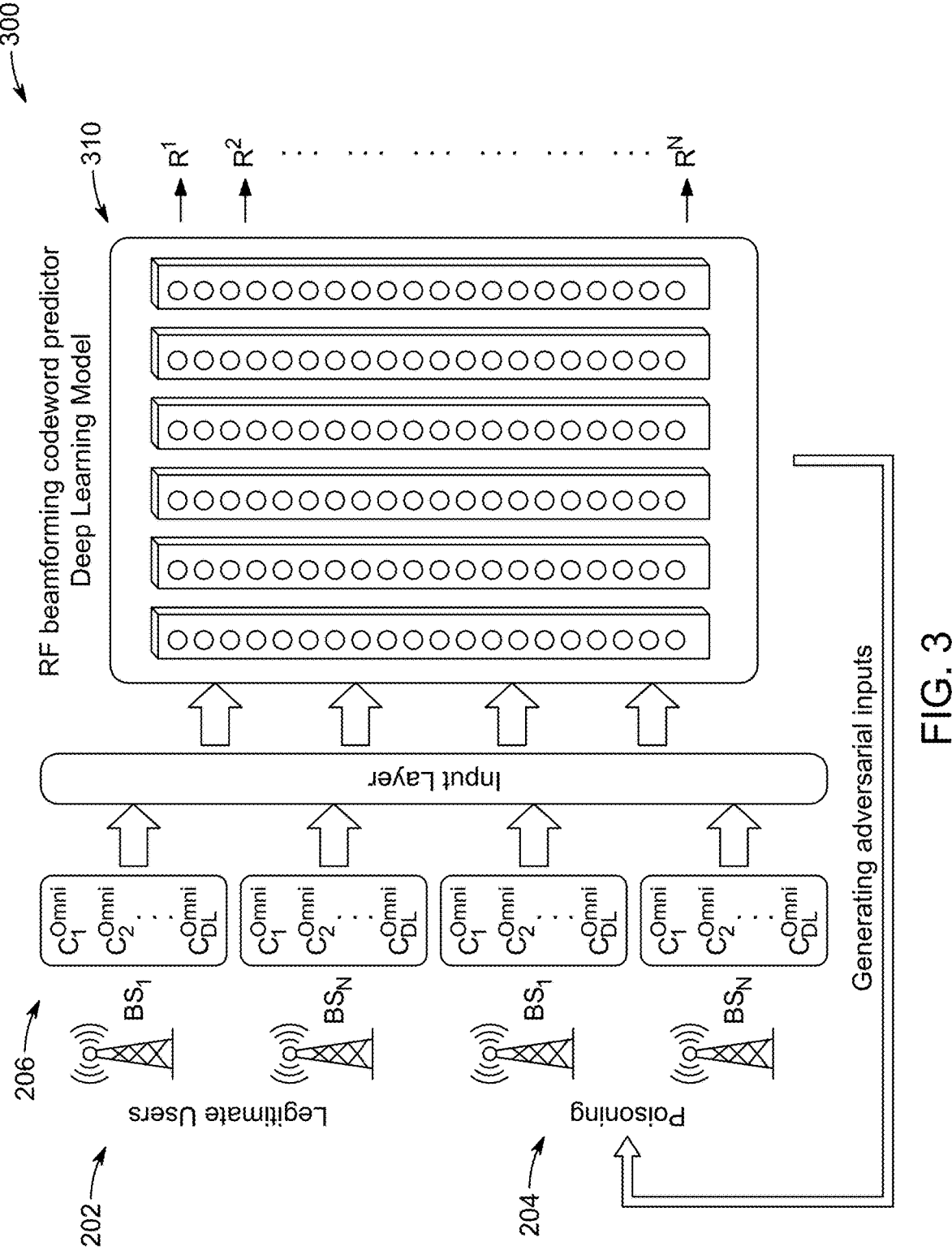
FIG. 3 is a flow diagram for an adversarial training method.

FIG. 3 is a flow diagram 300 for an RF beamforming codeword adversarial training method. A RF beamforming codeword predictor 310 is trained with omni signals from regular inputs 202 and adversarial inputs 204. The adversarial inputs 204 are generated by the RF beamforming codeword predictor 310.

C. Approach

Figure 4:
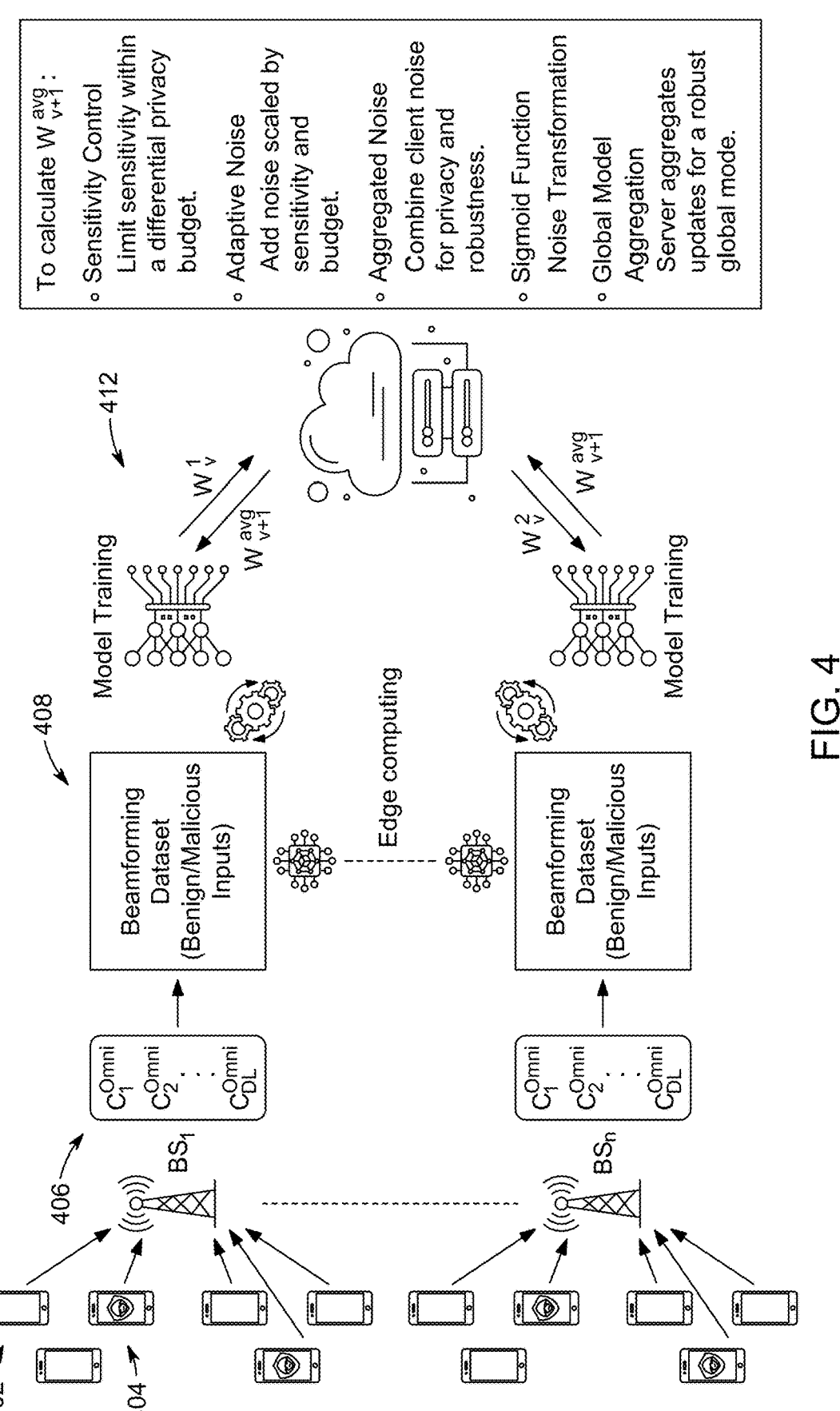
FIG. 4 is a DL-based FL coordinated beamforming model that aims to maintain clients' privacy while achieving high model accuracy, in accordance with an exemplary aspect of the disclosure.

FIG. 4 is a DL-based FL coordinated beamforming model that aims to maintain clients' privacy while achieving high model accuracy. An embodiment is an approach that integrates FL with adaptive noise and differential privacy principles. The decentralized nature of FL is leveraged by the embodiment to create a collaborative beam prediction model across multiple client devices. Preserving individual users' privacy is ensured by incorporating adaptive noise addition and differential privacy. Aspects of the approach are elaborated below.

The potential of FL is harnessed to train a collaborative beam prediction model across many client devices 402. The decentralized approach ensures that the model's performance benefits from diverse data sources while preserving the privacy of individual users.

FL is employed by the approach to enable the training of a collaborative beam prediction model across a multitude of client devices. In this approach, communication data are collected from the client devices 402 and BSs 406. However, instead of sending the data to the server 412, the data are sent to the edge devices 408 by the BSs 406. Edge devices in this invention encompass a wide range of computing devices, including nearby data centers, computing devices near base stations, drones, autonomous vehicles, and essentially any computing device in the vicinity of a user. A local model is then trained using the data by the edge devices 308. Periodically, the local model updated weights are shared with the server 412. The server 412 aggregates the weight updates to enhance the shared model without sharing the communication data from the client devices 402, edge devices 408, or BSs 406. This approach allows the local model to benefit from diverse data sources while preserving the privacy of individual users, as their data remain on their devices.

Sensitivity is defined as the maximum absolute value of weights in the model update, and is a key metric. Sensitivity is clipped at a threshold linked to the differential privacy budget to maintain privacy guarantees. This measure ensures that the FL process adheres to $(\epsilon, \delta)$-differential privacy, a fundamental benchmark for data privacy. The sensitivity is calculated using Eq. (7):

17

$$sensitivity = \begin{cases} max(val) & if \ max(val) > threshold \\ threshold & otherwise \end{cases} \quad (7)$$

where sensitivity refers to the maximum absolute value of weights in the model update, val represents the set of absolute values of weights, and threshold signifies the clipping threshold used for sensitivity.

In order for Adaptive Noise Addition to be used to safeguard clients' privacy, a crucial layer of protection is introduced. Noise is added to global model updates by the server 412, which is sampled from a Gaussian distribution. The scale of this noise is dynamically adjusted based on the sensitivity of the update. This process can be mathematically expressed, as shown in Eq. (8):

$$noise \ scale = \frac{sensitivity}{privacy \cdot budget} \quad (8)$$

where noise scale represents the scale of the added noise, sensitivity is the sensitivity of the model update, and a privacy budget is the available privacy budget.
Final Aggregated Noise:

The final aggregated noise is the mean of all the noise samples for each client device 402, as shown in Eq. (9):

$$noise\_avg = \frac{1}{N} \sum_{i=1}^{N} noise_i \quad (9)$$

where noise is the aggregated noise, N is the number of client devices, noise represents the noise added by the i-th client device.

A Sigmoid Function is used to promote privacy and stability while maintaining a smooth mapping. The aggregated noise transforms the sigmoid function, as shown in Eq. (10).

$$A\_noise = \frac{1}{1 + e^{-noise\_avg}} \quad (10)$$

where noise is the aggregated noise, e is the base of the natural logarithm.

The server 412 assumes a pivotal role in the approach by aggregating the noisy updates from edge devices 408. This aggregation process results in a robust Global Model that benefits from the collective intelligence of all participants.

Algorithm 2 is designed to achieve robust aggregation while incorporating adaptive noise and differential privacy mechanisms, with the aim of enabling secure and privacy-aware collaborative model training across a network of edge devices models. The algorithm begins by initializing empty lists for noise and updates and is followed by setting a threshold based on the desired privacy budget. Then, edge device(s) models are iterated through to have their weight updates collected. For each update, the computation of the maximum absolute weight value is performed, and the sensitivity is determined based on a specified threshold or the default threshold if none of the weight values exceed it. Subsequently, the noise scale for each update is calculated to satisfy the privacy budget, and noise samples generated from a Gaussian distribution are appended to the noise list. The noise is then averaged to obtain a noise average, and this value is transformed using a sigmoid function to create an adaptive noise factor ($A_{noise}$). The algorithm's output is the adaptive noise factor, which can be utilized in privacy-preserving aggregation techniques. A crucial role is played by it in enhancing the privacy guarantees of collaborative machine learning while allowing for robust model aggregation.

---

Algorithm 2: Robust Aggregation with Adaptive Noise and Differential Privacy

---

1:    noise ← []
2:    updates ← []
3:    threshold ← $\sqrt{2 \cdot log\left(\frac{1.0}{privacy\_budget}\right)}$
4:    for edge_devices_model in clients_models do
5:      updates.append(edge_devices_model.get_weights())
6:    end for
7:    for update in updates do
9:    sensitivity ← max$\left(\begin{array}{l}[val \ for \ val \ in \ max\_abs\_value \\ if \ val > threshold], \ default = threshold \end{array}\right)$
10:    noise_scale ← $\frac{sensitivity}{privacy\_budget}$
11:      noise.append(random.gauss(0, noise_scale))
12:    end for
13:    noise_avg ← $\frac{1}{len(noise)} \sum_{i=1}^{len(noise)} noise[i]$
14:    A $^+$noise ← [1/(1 + exp(−noise_avg))]
15:    return A $^+$ noise

---

EXAMPLES

The experimental setup and scenarios used to evaluate the DL-based mmWave beam prediction model are described. These experiments assess the model's performance under various conditions, including adversarial attacks, outdoor environments, and indoor settings. The experiments are categorized into three distinct cases to comprehensively evaluate the model:

Case 1: A vulnerable model is implemented, which could be attacked (Undefended model).

Case 2: The undefended model is attacked with FGSM to observe its performance under attack (Undefended model under FGSM attack).

Case 3: The DL-based mmWave beam prediction model is adversarially trained against FGSM attack (Defended model).

The model's performance under attack can be compared to that of the undefended and secure cases through these three cases. Furthermore, the suggested model is implemented in various circumstances, covering indoor and outdoor scenarios.

The details of these scenarios are presented below.

Figure 5:
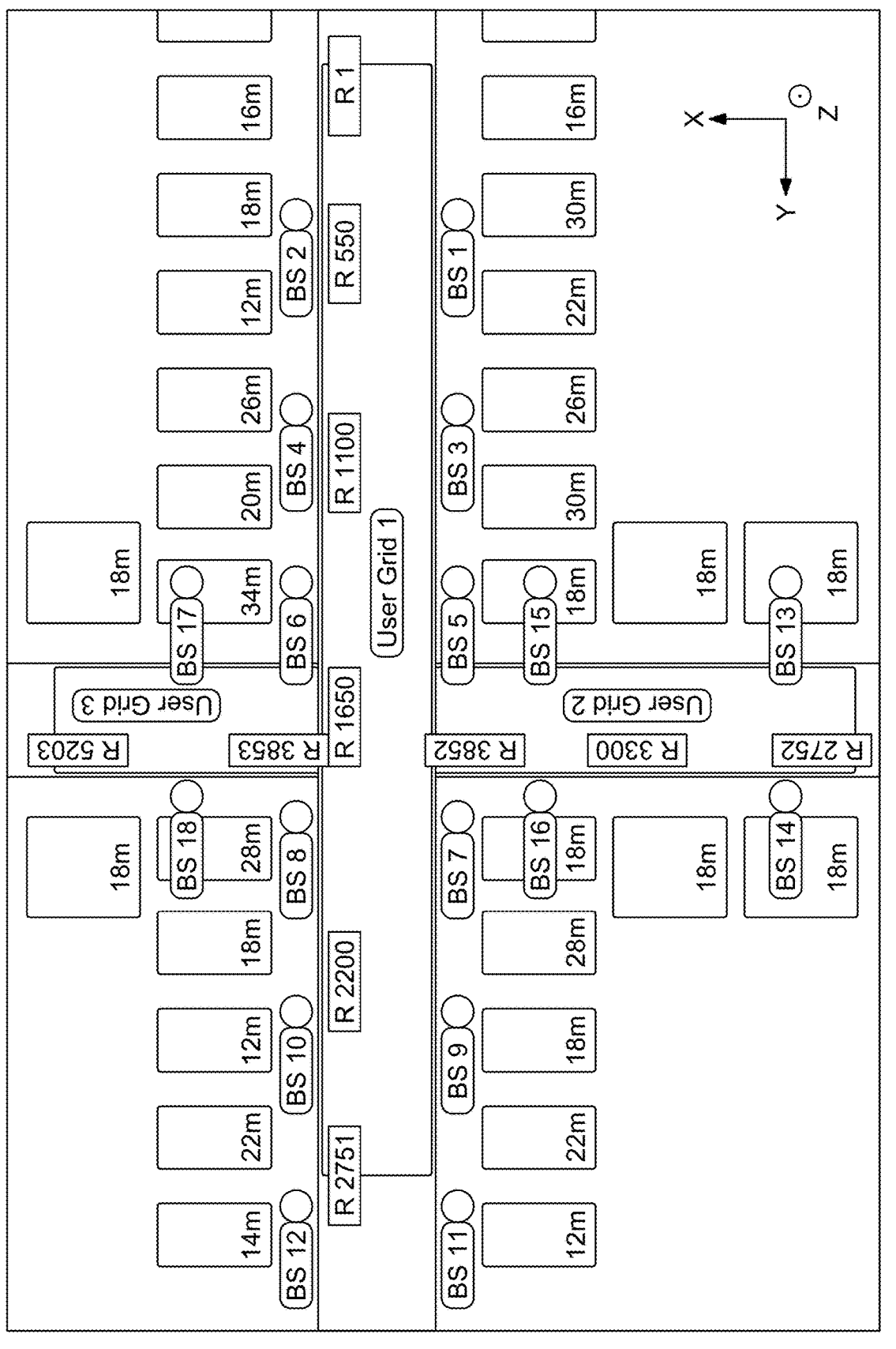
FIG. 5 is atop view of an outdoor Environment—Scenario O1.

Regarding FIG. 5, Scenario O1 is an outdoor environment with two streets and an intersection. It includes 18 BSs positioned strategically along these streets, with different separations between them. Over a million potential users are distributed across three user grids (UGs) with varying densities and spacing. The site plan includes buildings of different dimensions along the streets, and the scenario considers up to four reflections in the propagation model for wireless communication analysis.

Figure 6:
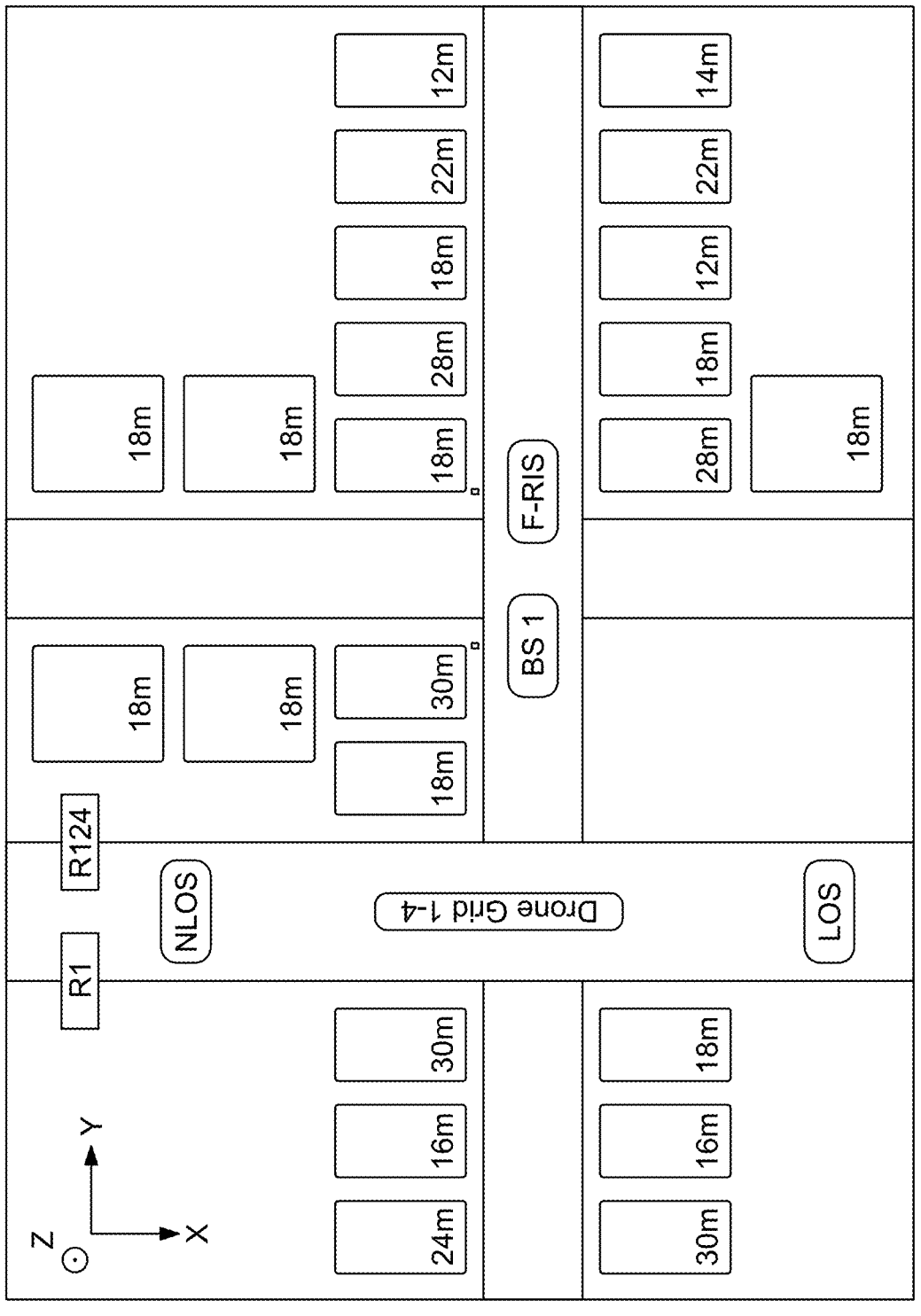
FIG. 6 is a top view of an aerial landscape—Scenario O1 drone.

Regarding FIG. 6, Scenario O1 is for a drone having an aerial landscape view featuring two streets and an intersection. It includes a BS (BS1) positioned at a height of 6 meters and a Flying Reflecting Intelligent Surface (Flying RIS or BS2) soaring at an impressive height of 80 meters above ground level. Within this scenario, four drone grids (UG1, UG2, UG3, and UG4) accommodate approximately 270,000 drones, each grid varying in height to create a dynamic aerial landscape.

Figure 7:
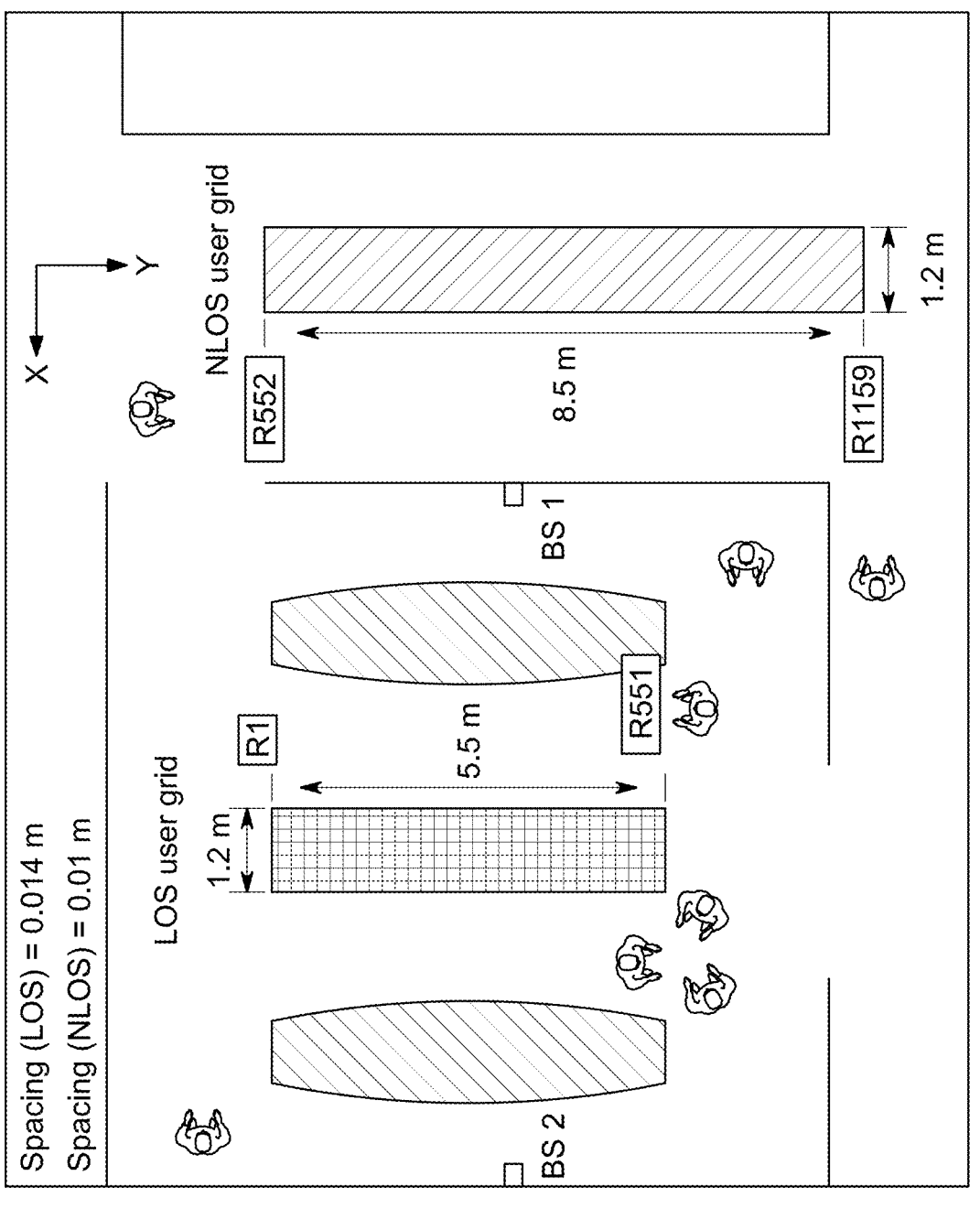
FIG. 7 is a top view of an indoor conference room—Scenario I3.

Regarding FIG. 7, Scenario I3 depicts an indoor conference room environment measuring 10×11×3 meters, complete with hallways. Inside this setting, two access points (BS1 and BS2) are positioned at 2 meters height, facilitating wireless communication. Over 118,000 potential users are considered, accounting for both Line-of-Sight (LOS) and Non-Line-of-Sight (NLOS) conditions, and data are available for operating frequencies at 2.4 GHz and 60 GHz.

Figure 8:
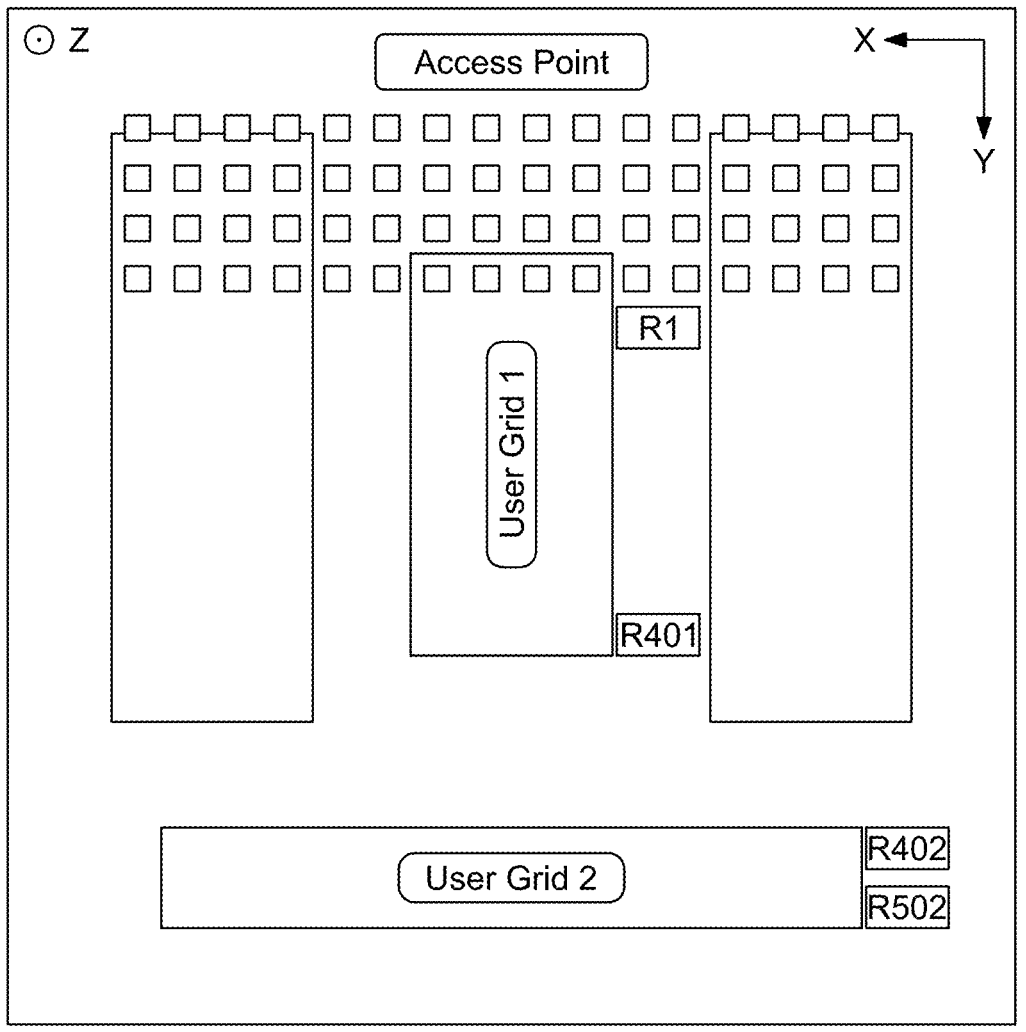
FIG. 8 is atop view of an indoor massive MIMO Setup—Scenario I1.

Regarding FIG. 8, Scenario I1 represents an indoor distributed massive MIMO setting within a 10×10×5 meter room containing two conference tables. The scenario boasts 64 ceiling-mounted antennas at a height of 2.5 meters, catering to over 150,000 potential users at a 1-meter height. Datasets cover operating frequencies of 2.4 GHz and 2.5 GHz.

TABLE I

Model Architectures Used in the Experiments

| Layer Type | Layer Information |
|---|---|
| Fully Connected + ReLU | 100 |
| Fully Connected + ReLU | 100 |
| Fully Connected + ReLU | 100 |
| Fully Connected + TanH | 1 |

Table I presents the model architectures utilized in the experiments. These architectures consist of four layers, each characterized by specific features. The first three layers are equipped with 100 neurons each, followed by Rectified Linear Unit (ReLU) activation functions. Complex data relationships are captured by these layers. The final layer comprises a single value output and is equipped with a hyperbolic tangent (Tan H) activation function. This architecture has been selected for optimization in the context of the experiments.

TABLE II

Millimeter-wave beam prediction model parameters used in the experiment.

| Parameter | Value |
|---|---|
| The optimizer used was | Adam |
| A learning rate of | 0.01 |
| A batch size of | 100 |
| A dropout ratio of | 0.25 |
| A total of | 10 epochs were conducted |
| The privacy budget | 0.1 |

Table II presents the millimeter-wave beam prediction model parameters utilized in the experiment. The optimizer used is Adam, with a learning rate of 0.01 applied. A batch size of 100 is employed for data processing during the experiment. To mitigate overfitting, a dropout ratio of 0.25 is utilized. The experiment consisted of a total of 10 epochs.

These parameter configurations are thoughtfully selected to balance model complexity and predictive performance.

Figure 9:
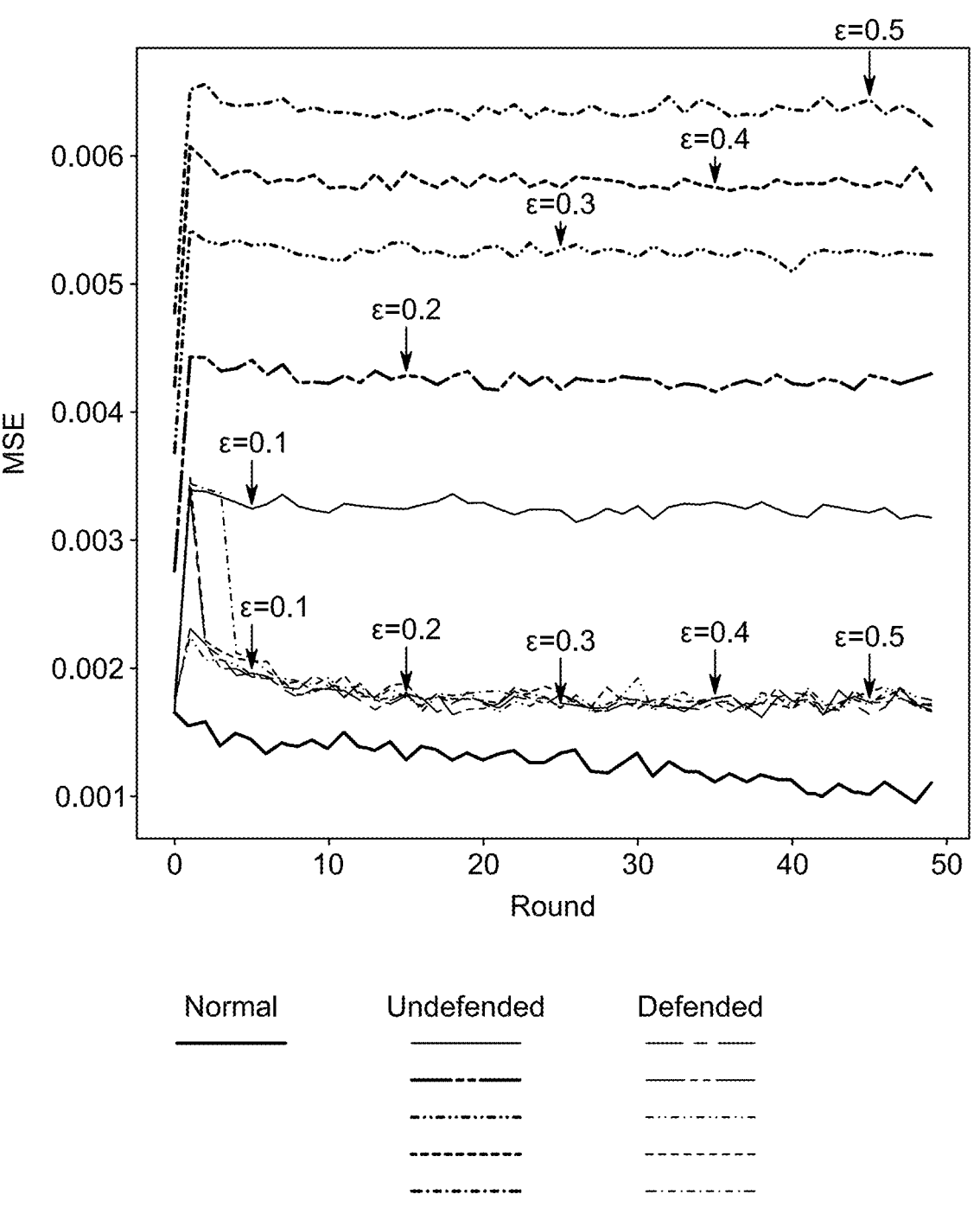
FIG. 9 is a plot of federated learning Behavioral Analysis in Scenario O1.

The results of FL-Scenario O1 experiments are presented in FIG. 9, where the x-axis represents the round number of FL. The experiments are conducted for different privacy levels, as represented by $\epsilon$ values: $\epsilon$=0.10, $\epsilon$=0.20, $\epsilon$=0.30, $\epsilon$=0.40, and $\epsilon$=0.50.

In the first set of experiments with $\epsilon$=0.10, "Behavior—Normal" shows a gradual decrease in loss values as the rounds progress, commencing with an average loss of approximately 0.0015 and steadily improving to an average loss of around 0.0012 after 50 rounds. Meanwhile, "Behavior—Undefended" is characterized by an initial drop in loss values, starting at approximately 0.0034, indicating malicious entities' initial compromise of the process. As the rounds progress, the loss values gradually increase, reaching an average loss of around 0.0032 after 50 rounds. "Behavior—Defended" is notable for initially exhibiting higher loss values than the normal FL process. However, the defense mechanisms adapt and stabilize over time, ultimately achieving an average loss of approximately 0.0018 after 50 rounds. Subsequent experiments with higher $\epsilon$ values, such as $\epsilon$=0.20, $\epsilon$=0.30, $\epsilon$=0.40, and $\epsilon$=0.50, follow a similar pattern. In each case, "Behavior—Normal" demonstrates improvement in model convergence. For instance, for $\epsilon$=0.20, the average loss decreases from around 0.0017 to 0.0013 after 50 rounds. For $\epsilon$=0.30, it decreases from 0.0018 to 0.0014; for $\epsilon$=0.40, it decreases from 0.0017 to 0.0014. Finally, for $\epsilon$=0.50, the average loss decreases from around 0.0017 to 0.0014. Regarding "Behavior—Undefended," it consistently exhibits an initial drop in loss values but later displays an upward trend across different $\epsilon$ values. For $\epsilon$=0.20, the average loss starts at approximately 0.0044 and ends at around 0.0043 after 50 rounds. For $\epsilon$=0.30, it starts at 0.0054 and ends at 0.0053, and for $\epsilon$=0.40, it starts at 0.0061 and ends at 0.0060. Finally, for $\epsilon$=0.50, it starts at 0.0065 and ends at 0.0064. In terms of "Behavior—Defended", it illustrates the response of defense mechanisms to attacks. Initially, defense mechanisms exhibit higher loss values compared to the normal FL process, but they stabilize over time. For $\epsilon$=0.20, the average loss decreases from around 0.0023 to 0.0020 after 50 rounds. For $\epsilon$=0.30, it decreases from 0.0020 to 0.0018, and for $\epsilon$=0.40, it decreases from 0.0019 to 0.0018. Finally, for $\epsilon$=0.50, the average loss decreases from around 0.0020 to 0.0018 after 50 rounds. As $\epsilon$ increases, the impact of attacks becomes more pronounced, leading to a more significant divergence between the "Attack" and "Normal" behaviors. Additionally, defense mechanisms adapt and become more effective in countering the attacks as the rounds progress, resulting in a convergence of the "Defended" behavior towards the "Normal" behavior. The convergence rates and final loss values depend on the $\epsilon$ value and the number of FL rounds, suggesting a trade-off between privacy ($\epsilon$) and model performance. These detailed behavioral analyses demonstrate how different privacy levels ($\epsilon$) affect the behavior of FL in terms of model convergence and vulnerability to attacks. The results underscore the importance of robust defense mechanisms in protecting FL systems from privacy breaches and highlight the need for fine-tuning the balance between privacy and model performance in real-world applications.

Figure 10:
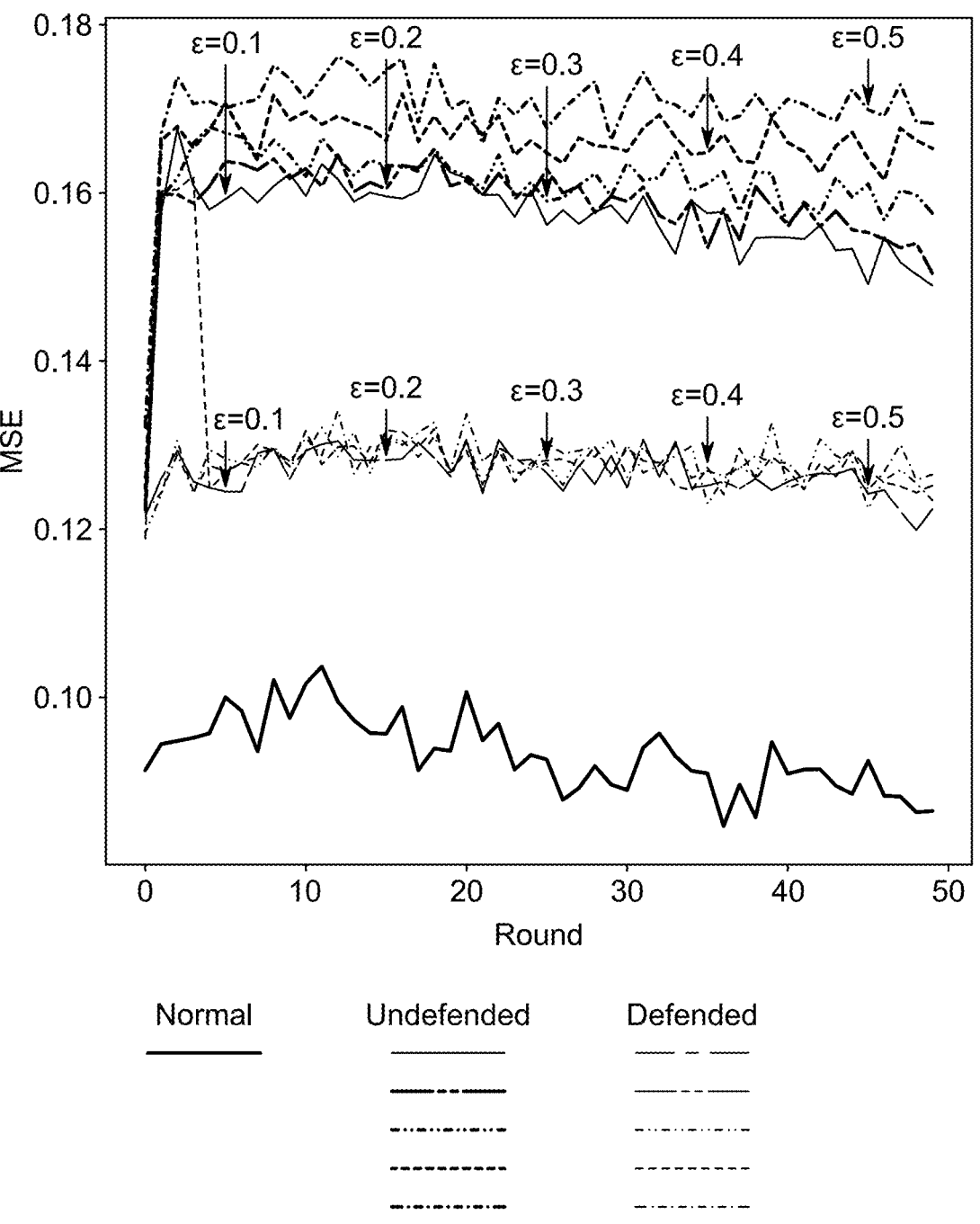
FIG. 10 is a plot of federated learning Behavioral Analysis in Scenario O1 drone.

FIG. 10 is a graph that displays the outcomes of an FL-Scenario O1 Drone experiment with varying privacy parameter values ($\epsilon$), where $\epsilon$ signifies the privacy parameter. With $\epsilon$=0.10, both the normal and attack scenarios exhibit upward trends, while the defense scenario remains relatively stable. Increasing $\epsilon$ to 0.20 introduces fluctuations in all scenarios, particularly the attack scenario, which displays significant variability. At $\epsilon$=0.30, the attack scenario begins at 0.1223 and steadily increases, while the normal scenario decreases to approximately 0.1223. Setting $\epsilon$ to 0.40 results in substantial fluctuations in the attack scenario and reduced performance in the normal scenario. Conversely, the defense scenario demonstrates a consistent upward trend. At $\epsilon$=0.50, the normal scenario remains relatively stable, while the attack scenario steadily increases. In summary, smaller $\epsilon$ values contribute to more stable performance in the normal scenario but allow more significant variability in the attack and defense scenarios. Larger $\epsilon$ values offer stability in the attack scenario but compromise the privacy of FL participants. $\epsilon$=0.30 strikes a balance between privacy and performance, although fluctuations in performance remain noticeable. These findings emphasize the significant impact of $\epsilon$ selection on FL outcomes, underscoring the importance of finding the right balance between privacy and performance in real-world applications.

Figure 11:
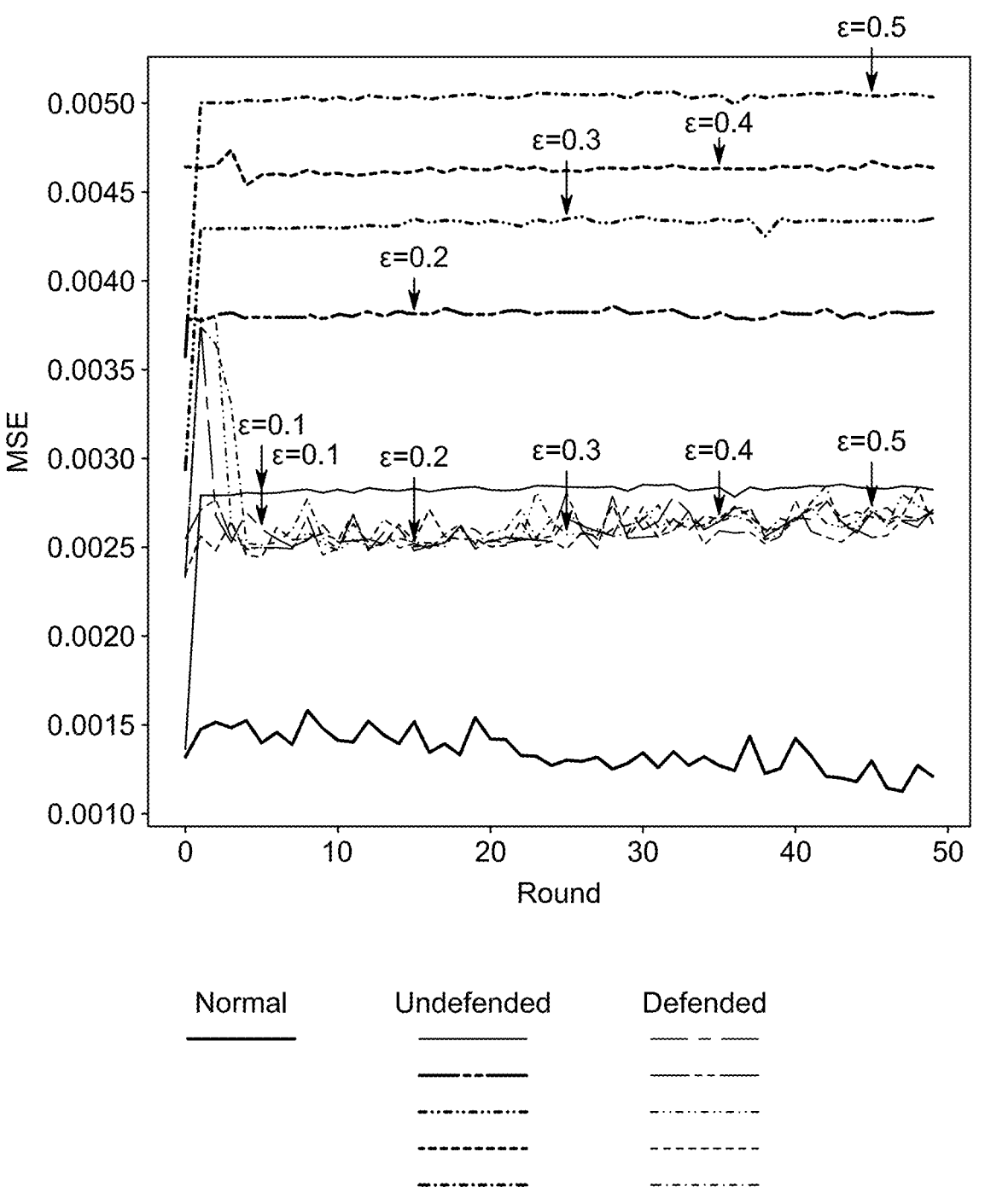
FIG. 11 is a graph of Behavioral Analysis in Scenario I3.

The outcomes of FL experiments conducted under Scenario I3 for various $\epsilon$ values are depicted in the graph in FIG. 11. For $\epsilon$=0.10, the normal FL process exhibited a consistent decrease in loss, starting at approximately 0.001318 and converging to around 0.001210, indicating ongoing model improvement. On the other hand, the attack scenario displayed an escalating loss, starting at about 0.001363 and reaching approximately 0.002854 after multiple rounds, signifying a substantial performance decline. The defense mechanism, designed to mitigate the attack's impact, demonstrated a similar upward trend in loss, increasing from approximately 0.002336 to about 0.002711. However, it outperformed the attacked model while underperforming compared to the normal model.

In this $\epsilon$=0.10 scenario within Scenario I3, the attack affected the FL process, as evidenced by the rising loss. The defense mechanism partially mitigated the attack's impact but did not fully recover the model's performance. At $\epsilon$=0.20, the normal FL process began with a loss of approximately 0.001318 and gradually increased, stabilizing at around 0.001200 after numerous rounds. In contrast, the attack scenario demonstrated a significant loss increase, starting at 0.003785985 and reaching 0.005002221, indicating a severe impact on model performance due to the attack. The defense mechanism initiated with a loss of 0.0025492 and gradually increased to around 0.002707862, performing better than the attacked model but worse than the normal model.

At $\epsilon$=0.20 within Scenario I3, the attack had a more pronounced effect on the model, resulting in a substantial loss increase. The defense mechanism provided some protection but remained less effective than the normal FL process. For $\epsilon$=0.30, the normal FL process started with a loss of approximately 0.001318 and converged to around 0.001210. Meanwhile, the attack scenario exhibited a significant loss increase, starting at 0.002936878 and reaching 0.005003158, signifying a substantial impact. With an initial loss of 0.002333137, the defense mechanism increased to around 0.002834787, offering some protection but falling short of the normal model's performance.

The attack severely impacted the model in the $\epsilon$=0.30 scenario within Scenario I3, resulting in a considerable loss increase. The defense mechanism provided some mitigation but could not fully restore the model's performance. At $\epsilon$=0.40, the normal FL process began with a loss of approximately 0.001318 and converged to around 0.001180. The attack scenario showed a substantial loss increase, starting at 0.004642202 and reaching 0.00473627. The defense mechanism, initiating with a loss of 0.002347205, increased to around 0.002834787.

To summarize, under Scenario I3, the FL experiments revealed an increasing impact of the attack on the model as $\epsilon$ values increased. Although the defense mechanisms provided some protection, they could not fully recover the model's performance compared to the normal FL process. This highlights the challenge of maintaining model privacy and security in FL environments, particularly with increasing $\epsilon$ values. Further research and improvements in defense mechanisms are necessary to address these challenges.

Figure 12:
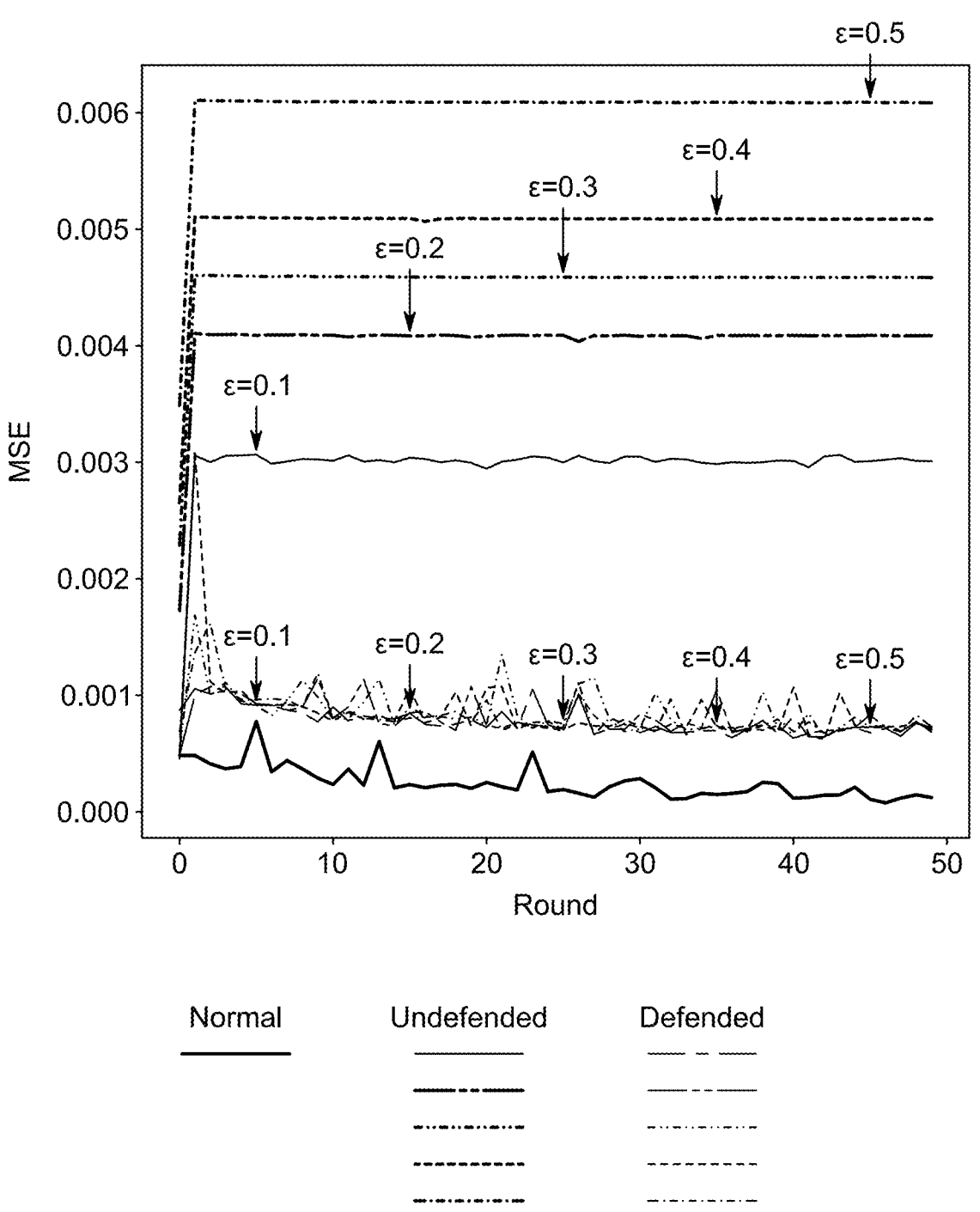
FIG. 12 is a graph of Behavioral Analysis in Scenario I1.
Figure 13A:
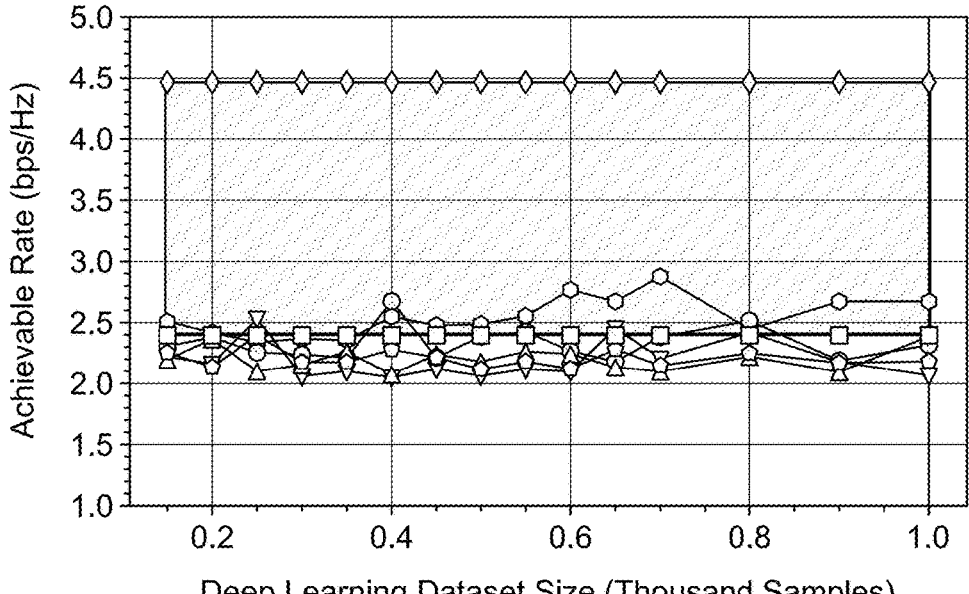
FIGS. 13A and 13B are graphs of DL-based FL Model Results with Beamforming Codewords for Scenario O1 Across Various $\epsilon$ Values.
Figure 13B:
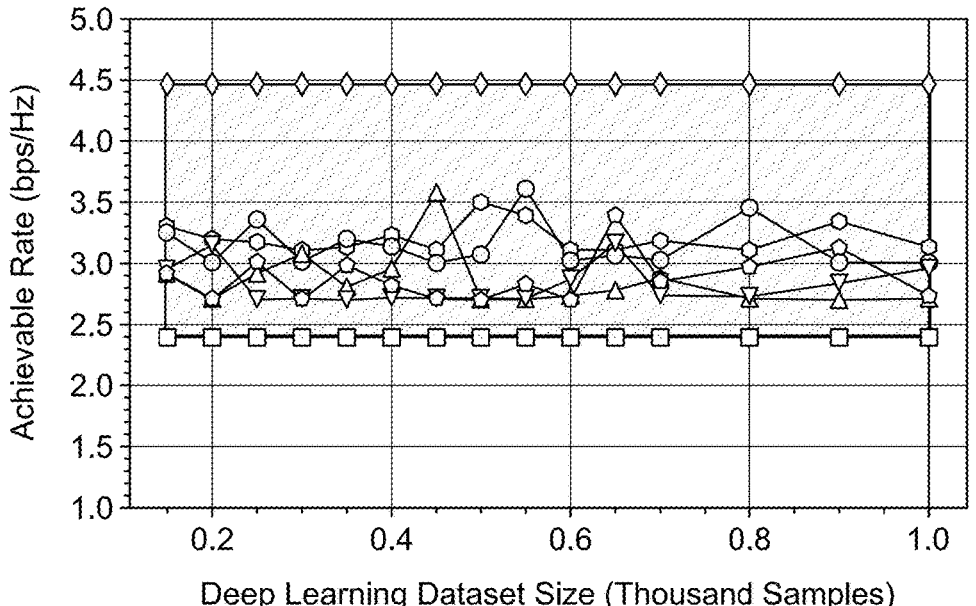
Figure 14A:
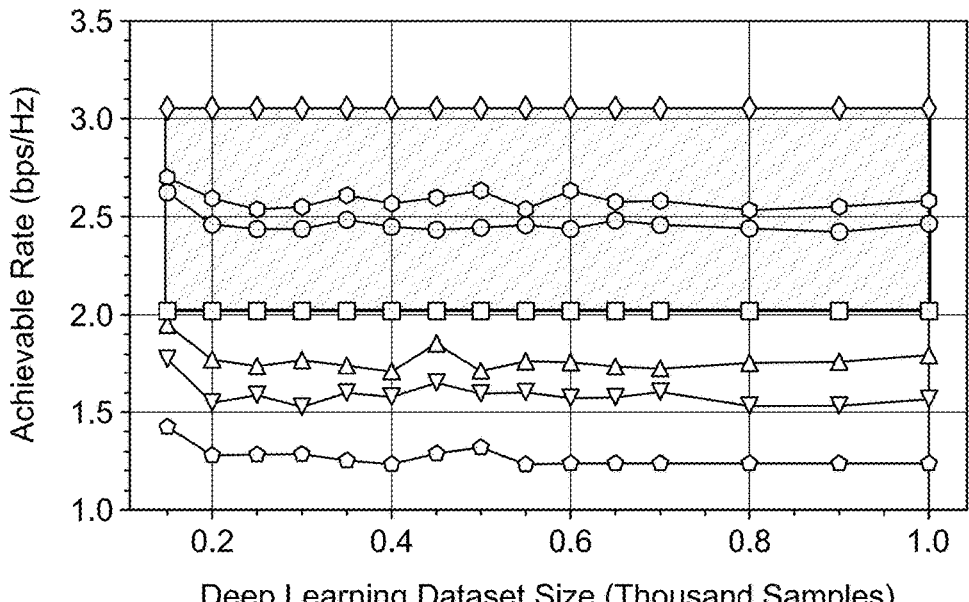
FIGS. 14A and 14B are graphs of DL-based FL Model Results with Beamforming Codewords for Scenario O1 Drone Across Various $\epsilon$ Values.
Figure 14B:
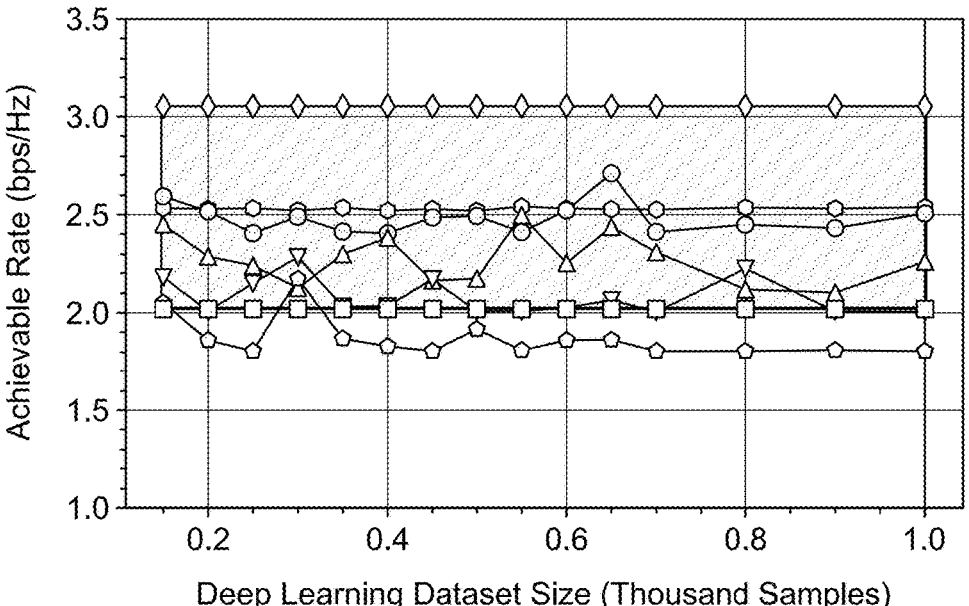
Figure 15A:
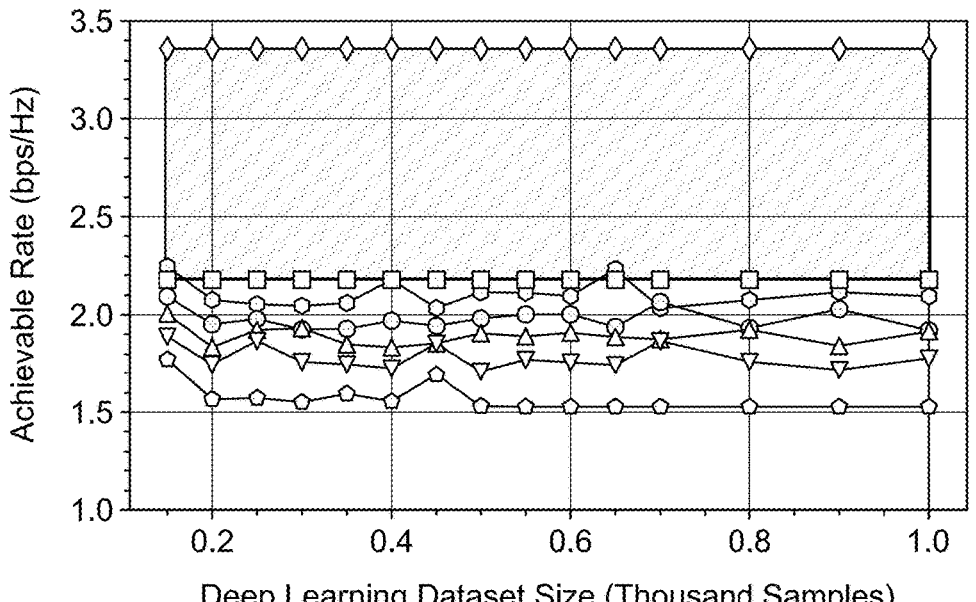
FIGS. 15A and 15B are graphs of DL-based FL Model Results with Beamforming Codewords for Scenario I3 Across Various $\epsilon$ Values.
Figure 15B:
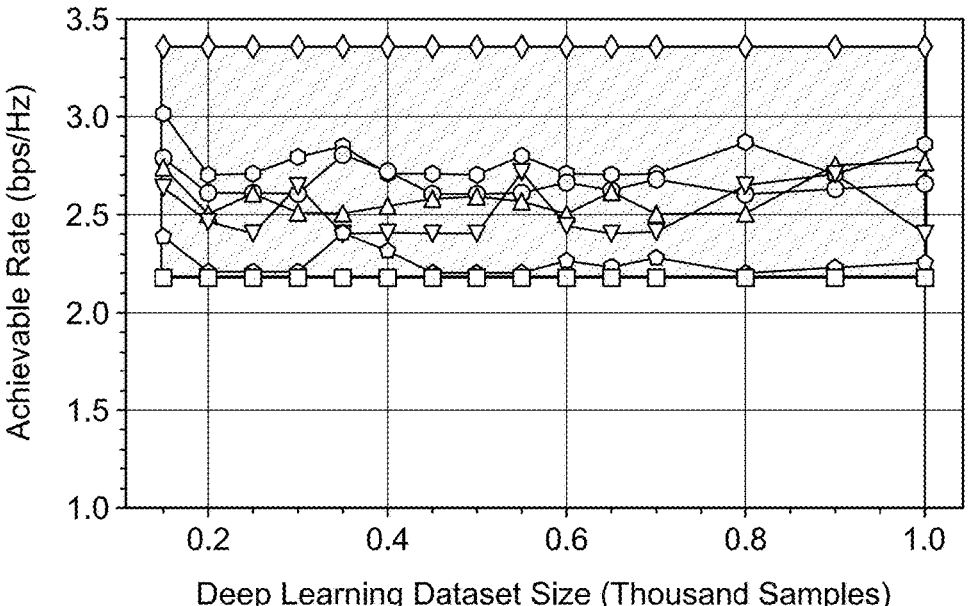
Figure 16A:
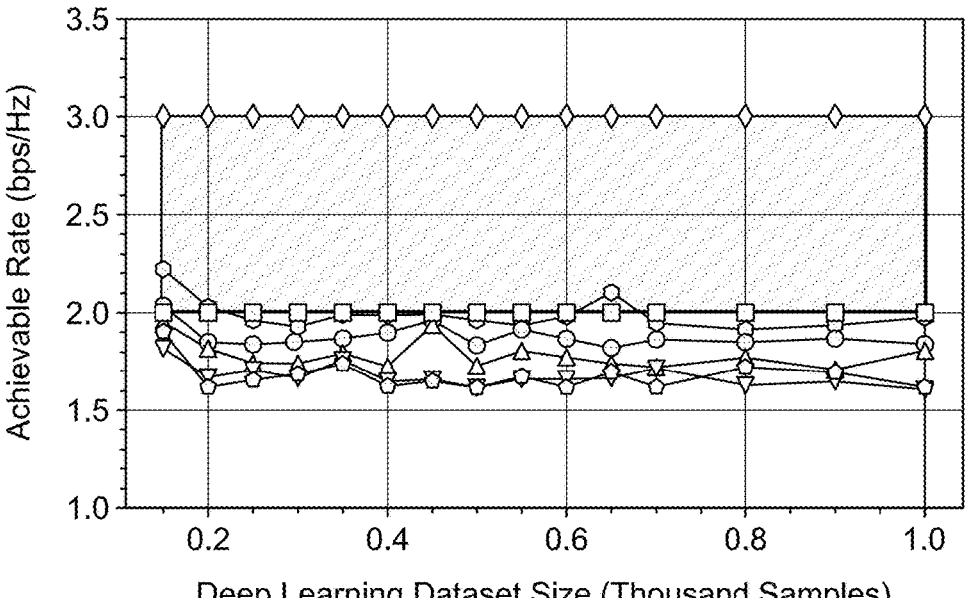
FIGS. 16A and 16B are graphs of DL-based FL Model Results with Beamforming Codewords for Scenario I1 Across Various $\epsilon$ Values.
Figure 16B:
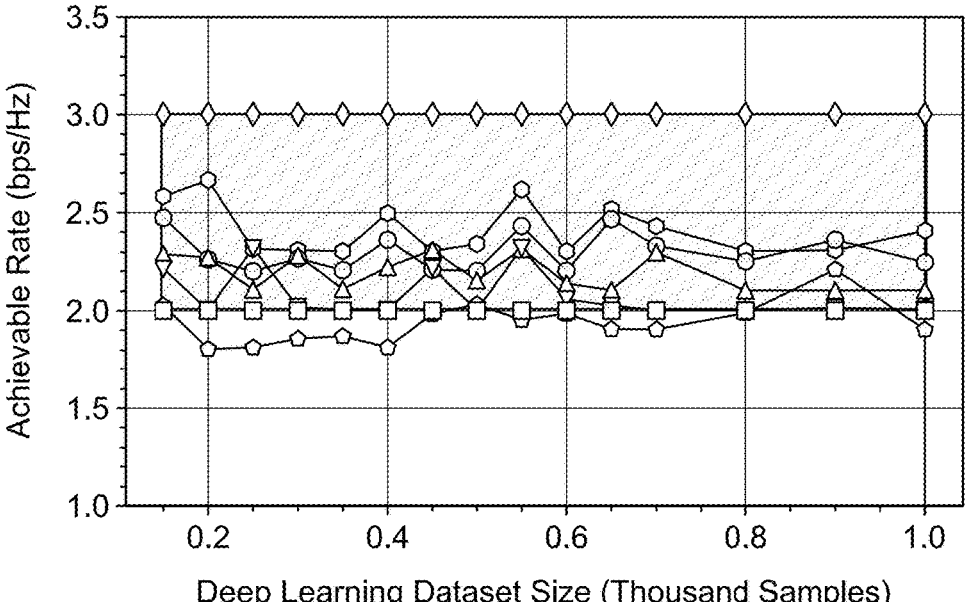

FIG. 12 illustrates the results of the FL experiment conducted under Scenario I1, where the privacy parameter $\epsilon$ is varied to study its impact. For $\epsilon$=0.10, the normal FL process shows fast convergence, achieving low loss after a limited number of rounds. The privacy attack causes significant fluctuations in the loss, indicating a compromised learning process. However, the defense mechanisms effectively mitigate the attack's impact and maintain a low and stable loss.

At $\epsilon$=0.20, normal FL converges rapidly with minimal loss, but the attack exerts a more pronounced influence, resulting in elevated and volatile loss values. The defense mechanisms remain effective, upholding lower and more stable loss levels compared to the scenario under attack. For $\epsilon$=0.30, the normal FL process sustains a relatively low loss, requiring more rounds to converge than smaller $\epsilon$ values. The privacy attack introduces significant disruptions, causing a surge in loss values with noticeable fluctuations. Nonetheless, the defense mechanisms prove effective in protecting against the attack, maintaining lower and more stable loss levels.

At $\epsilon$=0.40, normal FL exhibits slower convergence, but the loss remains relatively low. The attack disrupts the process, leading to an increase in loss values with fluctuations. However, the defense mechanisms persist in effectiveness, averting the escalation of loss attributed to the attack. For $\epsilon$=0.50, normal FL converges even more slowly, but the loss remains manageable. The attack substantially influences the model's convergence, resulting in elevated and fluctuating loss. Nevertheless, the defense mechanisms continue to play a vital role in preserving lower and more stable loss compared to the attacked scenario.

To sum up, smaller $\epsilon$ values facilitate faster convergence in regular FL but increase susceptibility to privacy attacks. In contrast, larger $\epsilon$ values lead to slower convergence but enhance resistance against attacks with the assistance of defense mechanisms. These defense mechanisms effectively stabilize loss and prevent it from reaching excessive levels when the model is attacked. Therefore, choosing $\epsilon$ carefully and implementing defense mechanisms to balance privacy preservation and model performance is crucial.

The achievable rate of the system under attack in Eq. 6 is aimed to be optimized through these cases. The experiments can be conducted, and Python scripts and ML libraries like Keras, Tensorflow, and Scikit-learn can be employed on a 2.8 GHz Quad-Core Intel Core i7 machine with 16 GB of RAM. Two models, namely undefended and defended (i.e., adversarially), are developed to obtain prediction results for all scenarios. The first model is trained without any input poisoning and is employed with legitimate users (for C1) and adversaries (for C2), while the second model is employed under the FGSM attack. The hyperparameters, such as the number of hidden layers and neurons in the hidden layers, the activation function, the loss function, and the optimization method, are kept the same for both models.

A comparison between the original model, a defended version of the model under FGSM attacks, and the traditional communication system tools as a baseline is presented by FIGS. 13A, 13B, 14A, 14B, 15A, 15B, 16A, 16B. See Catak et al. (2021). These figures indicate the impressive accuracy of the DL-based FL model's predictions compared to the original values.

In the evaluation, the l$\infty$ norm, or the maximum allowable perturbation that each element in the input vector x can withstand, is used as the distance metric. The green-shaded regions in the figures represent the acceptable range between the optimal and overhead limits. It is clear from the data visualization that the green zone routinely fell below the performance of undefended models when exposed to low $\epsilon$ values.

For models that exhibit a substantial reduction in performance under adversarial training (i.e., falling below the green zone), it should be highlighted that the attacker must employ an exceptionally high $\epsilon$ value. In essence, introducing more noise into the system, which raises the attacker's vulnerability, is equated with a high $\epsilon$ value. In this setting, adversarial training coupled with FL provides a powerful defense mechanism, effectively protecting the DL model against FGSM attacks.

A combination of FL, adaptive noise addition, sensitivity and differential privacy, and global model aggregation is introduced by the disclosed approach. The power of FL is leveraged to train a collaborative beam prediction model across multiple client devices in this decentralized approach. The model's performance is optimized by harnessing diverse data sources while preserving individual users' privacy.

By adding adaptive noise to local model updates and maintaining a strict differential privacy budget, privacy protections during the FL process are enhanced by the disclosed approach. A robust global model that benefits from the collective intelligence of all participants is the result of the server's role in aggregating the noisy updates from client devices.

Compared to the original, undefended model, which is vulnerable when subjected to FGSM attacks, the disclosed method demonstrates a noteworthy resilience against adversarial attacks. The mean squared error (MSE) for the attacked model is approximately 40 times higher than that of the normal, undefended model (i.e., 0.00843 [Normal] vs. 0.00021 [Attacked]≈40.14). The significance of the disclosed adversarial training combined with FL as a strategy to strengthen the model's resilience is underscored by this discrepancy.

In summary, an effective strategy for protecting DL models against adversarial ML attacks is the disclosed approach, which combines adversarial training with FL. The victim model's loss function is perturbed, and the model is then retrained with the newly created adversarial instances and their corresponding outputs, consistently proving to be effective in fortifying DL models. In FL environments, this ensures the integrity and reliability of these models in the face of potential threats, thereby making significant strides in secure, decentralized ML.

TABLE III

Performance Summary of Attack and Defense Strategies

| Scenario | Attack | Defense | % Improvement |
|---|---|---|---|
| O1_60 | 2.41 | 2.79 | 15.75% |
| O1_drone_200 | 2.40 | 2.43 | 1.12% |
| I3_60 | 1.96 | 2.38 | 21.82% |

TABLE III-continued

Performance Summary of Attack and Defense Strategies

| Scenario | Attack | Defense | % Improvement |
|---|---|---|---|
| I1_2p5 | 2.07 | 2.71 | 31.10% |
| Average | 2.21 | 2.58 | 17.45% |

Table III displays the performance metrics of the attack and defense strategies in different scenarios. The percentage improvement in the DL-based FL coordinated beamforming model varies significantly across scenarios, with some scenarios showing noticeable enhancements with the Defense strategy. In scenario O1, the attack strategy achieves an average DL-based FL coordinated beamforming model of 2.4098, while the defense strategy achieves 2.7894, resulting in a 15.75% improvement in favor of the defense strategy. This scenario demonstrates the effectiveness of the attack approach in optimizing overhead. In the scenario O1 drone, the performance difference between Attack and Defense is less pronounced. The attack strategy achieves 2.3997, while defense achieves 2.4265, resulting in a modest 1.12% improvement with the defense strategy. Scenario I3 significantly improves with the defense strategy, with an average DL-based FL coordinated beamforming model of 2.3883, outperforming the attack 1.9605. This represents a remarkable 21.82% In scenario I1, the defense strategy performs exceptionally well, achieving an average DL-based FL coordinated beamforming model of 2.7179, compared to attack 2.0727. This substantial difference results in a 31.10% improvement in the defense strategy, underscoring its significant benefits.

The final row of the table indicates an average percentage improvement of 17.45% across all scenarios, demonstrating the overall trend of the defense strategy outperforming the attack strategy in optimizing the DL-based FL coordinated beamforming model. These results collectively illustrate the effectiveness of the defense strategy in enhancing overhead optimization in various scenarios. The substantial improvements observed in several scenarios emphasize the importance of context-specific strategies for optimization.

In one implementation, the functions and processes of the mobile device 302 may be implemented by one or more respective processing circuits 1726. A processing circuit includes a programmed processor as a processor includes circuitry. A processing circuit may also include devices such as an application specific integrated circuit (ASIC) and conventional circuit components arranged to perform the recited functions. Note that circuitry refers to a circuit or system of circuits. Herein, the circuitry may be in one computer system or may be distributed throughout a network of computer systems. Hence, the circuitry of the mobile device 302 for example may be in only one server or distributed among different computers.

Figure 17:
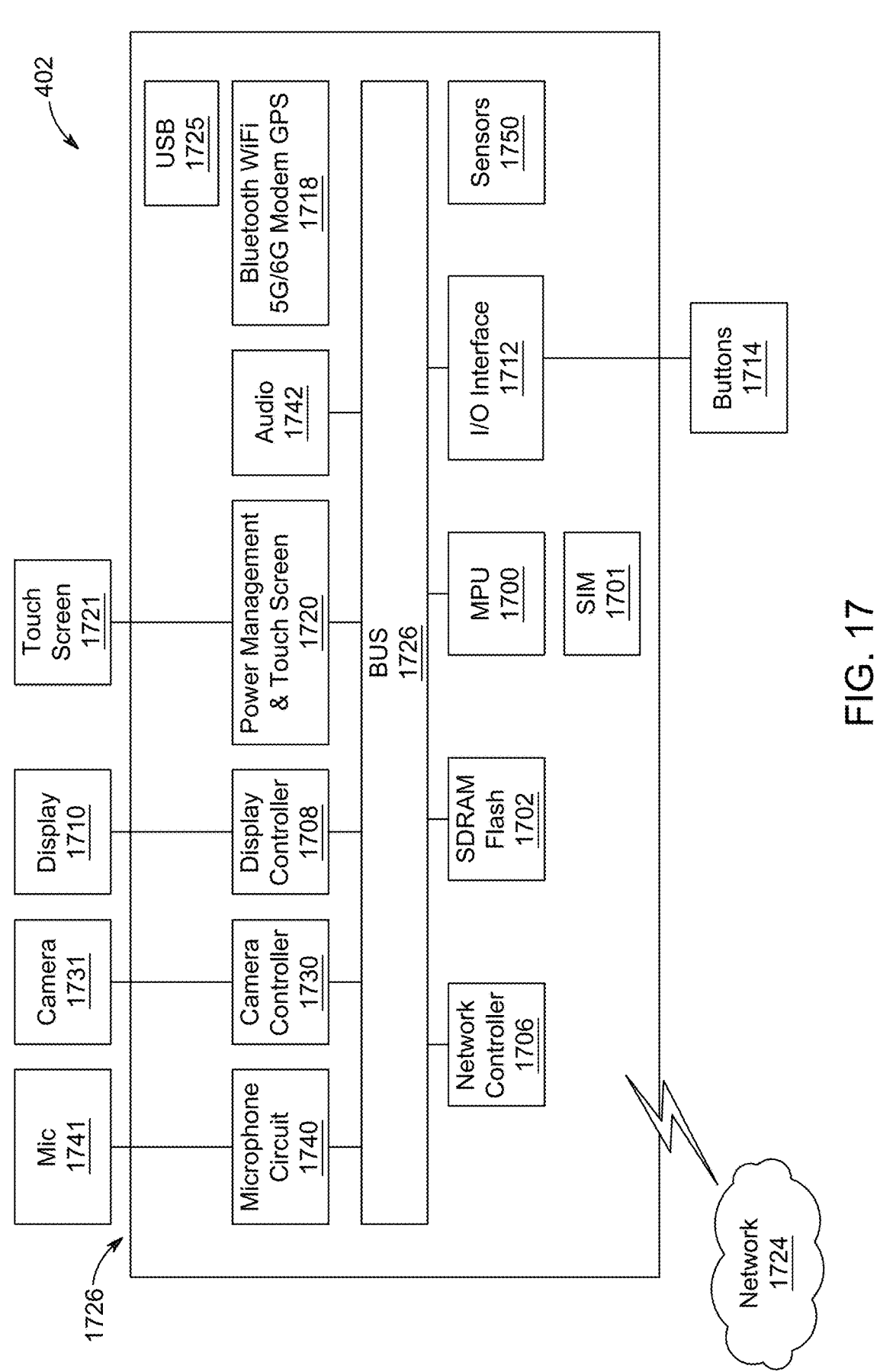
FIG. 17 is a block diagram of a computer system for a mobile device, in accordance with an exemplary aspect of the disclosure.

A user mobile device 402 is incorporated with communication circuitry for performing 5G as well as 6G cellular communication. In FIG. 17, a processing circuit 1726 includes a Mobile Processing Unit (MPU) 1700 which performs the processes described herein. The process data and instructions may be stored in memory 1702. These processes and instructions may also be stored on a portable storage medium or may be stored remotely. The processing circuit 1726 may have a replaceable Subscriber Identity Module (SIM) 1701 that contains information that is unique to the network service of the mobile device 130.

Further, the hardware/software implementation is not limited by the form of the computer-readable media on which the instructions of the inventive process are stored. For example, the instructions may be stored in FLASH memory, Secure Digital Random Access Memory (SDRAM), Random Access Memory (RAM), Read Only Memory (ROM), Programmable Read-Only Memory (PROM), Erasable Programmable Read-Only Memory (EPROM), Electrically Erasable Programmable Read Only Memory (EEPROM), solid-state hard disk or any other information processing device with which the processing circuit 1726 communicates, such as a server or computer.

Further, the computer program may be implemented as a utility application, background daemon, or component of an operating system, or combination thereof, executing in conjunction with MPU 1700 and a mobile operating system such as Android, Microsoft® Windows® 10 Mobile, Apple iOS® and other systems known to those skilled in the art.

In order to achieve the processing circuit 1726, the hardware elements may be realized by various circuitry elements, known to those skilled in the art. For example, MPU 1700 may be a Qualcomm mobile processor, a Nvidia mobile processor, a Atom® processor from Intel Corporation of America, a Samsung mobile processor, or a Apple A7 mobile processor, or may be other processor types that would be recognized by one of ordinary skill in the art. Alternatively, the MPU 1700 may be implemented on an Field-Programmable Gate Array (FPGA), Application Specific Integrated Circuit (ASIC), Programmable Logic Device (PLD) or using discrete logic circuits, as one of ordinary skill in the art would recognize. Further, MPU 1700 may be implemented as multiple processors cooperatively working in parallel to perform the instructions of the inventive processes described above.

The processing circuit 1726 in FIG. 17 also includes a network controller 1706, such as an Intel Ethernet PRO network interface card from Intel Corporation of America, for interfacing with network 1724. As can be appreciated, the network 1724 can be a public network, such as the Internet, or a private network such as LAN or WAN network, or any combination thereof and can also include PSTN or ISDN sub-networks. The network 1724 can also be wired, such as an Ethernet network. The processing circuit includes various types of communications processors for wireless communications including 5G and 6G wireless modems, WiFi®, Bluetooth®, GPS, as well as any other wireless form of communication that is known.

The processing circuit 1726 includes a Universal Serial Bus (USB) controller 1725 which may be managed by the MPU 1700.

The processing circuit 1726 further includes a display controller 1708, such as a NVIDIA® GeForce® GTX or Quadro® graphics adaptor from NVIDIA Corporation of America for interfacing with display 1710. An I/O interface 1712 interfaces with buttons 1714, such as for volume control. In addition to the I/O interface 1712 and the display 1710, the processing circuit 1726 may further include a microphone 1741 and one or more cameras 1731. The microphone 1741 may have associated circuitry 1740 for processing the sound into digital signals. Similarly, the camera 1731 may include a camera controller 1730 for controlling image capture operation of the camera 1731. In an exemplary aspect, the camera 1731 may include a Charge Coupled Device (CCD). The processing circuit 1726 may include an audio circuit 1742 for generating sound output signals, and may include an optional sound output port.

The power management and touch screen controller 1720 manages power used by the processing circuit 1726 and touch control. The communication bus 1722, which may be an Industry Standard Architecture (ISA), Extended Industry Standard Architecture (EISA), Video Electronics Standards Association (VESA), Peripheral Component Interface (PCI), or similar, for interconnecting all of the components of the processing circuit 1726. A description of the general features and functionality of the display 1710, buttons 1714, as well as the display controller 1708, power management controller 1720, network controller 1706, and I/O interface 1712 is omitted herein for brevity as these features are known.

Figure 18:
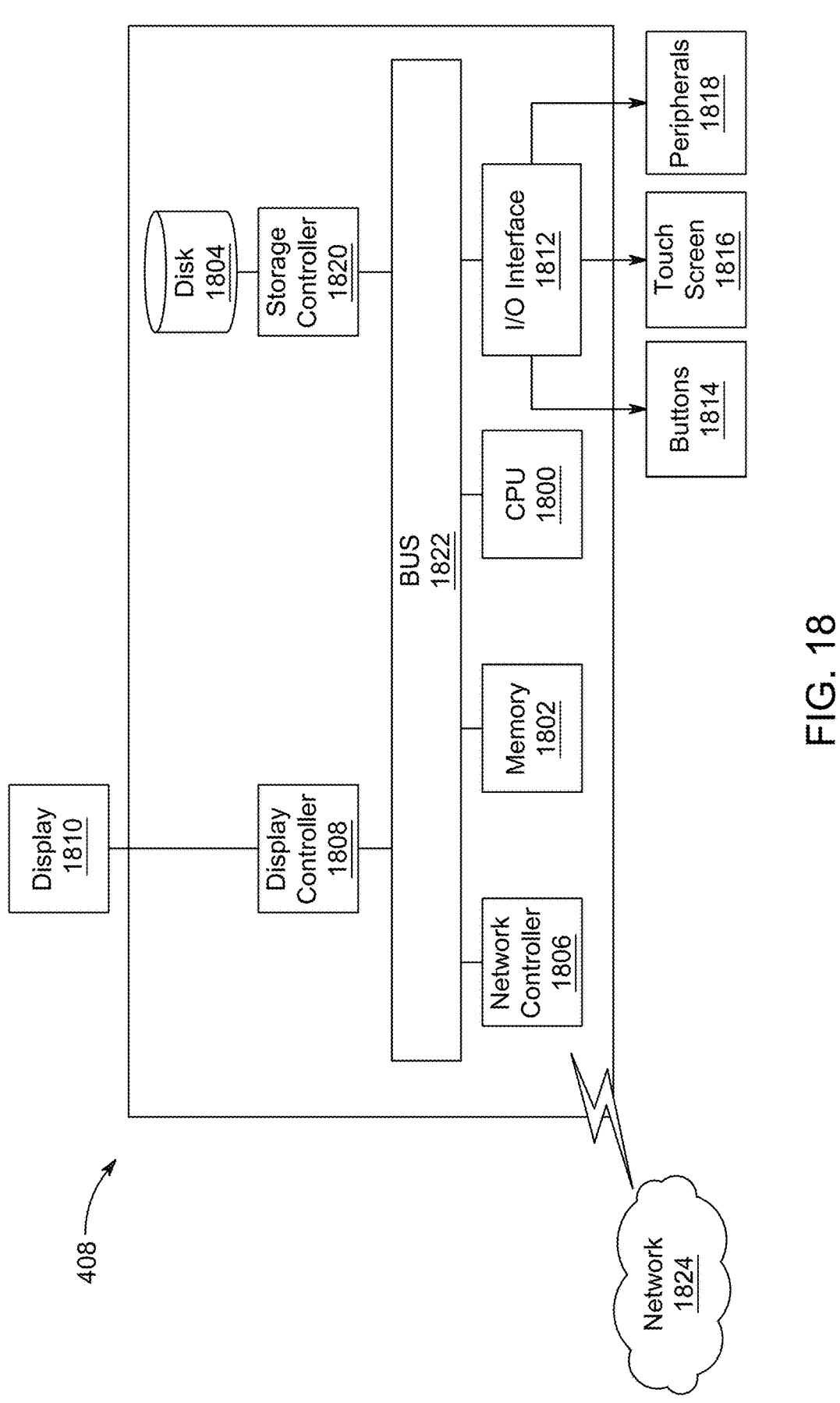
FIG. 18 is a block diagram of a computer system for an edge computing device, in accordance with an exemplary aspect of the disclosure.

FIG. 18 is a block diagram of a computer system for a general edge computing device. In one implementation, the functions and processes of the edge computing device 408 may be implemented by a computer 1826. Next, a hardware description of the computer 1826 according to exemplary embodiments is described with reference to FIG. 18. In FIG. 18, the computer 1826 includes a CPU 1800 which performs the processes described herein. The process data and instructions may be stored in memory 1802. These processes and instructions may also be stored on a storage medium disk 1804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1826 communicates, such as a server or computer.

Further, the software program may be provided as a utility application, background daemon, or component of an operating system, or combination thereof, executing in conjunction with CPU 1800 and an operating system such as Microsoft® Windows®, UNIX®, Oracle® Solaris, LINUX®, Apple macOS® and other systems known to those skilled in the art.

In order to achieve the computer 1826, the hardware elements may be realized by various circuitry elements, known to those skilled in the art. For example, CPU 1800 may be a Xenon® or Core® processor from Intel Corporation of America or an Opteron® processor from AMD of America, or may be other processor types that would be recognized by one of ordinary skill in the art. Alternatively, the CPU 1800 may be implemented on an FPGA, ASIC, PLD or using discrete logic circuits, as one of ordinary skill in the art would recognize. Further, CPU 1800 may be implemented as multiple processors cooperatively working in parallel to perform the instructions of the inventive processes described above.

The computer 1826 in FIG. 18 also includes a network controller 1806, such as an Intel Ethernet PRO network interface card from Intel Corporation of America, for interfacing with network 1824. As can be appreciated, the network 1824 can be a public network, such as the Internet, or a private network such as LAN or WAN network, or any combination thereof and can also include PSTN or ISDN sub-networks. The network 1824 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1826 further includes a display controller 1808, such as a NVIDIA® GeForce® GTX or Quadro® graphics adaptor from NVIDIA Corporation of America for interfacing with display 1810, such as a Hewlett Packard® HPL2445w LCD monitor. A general purpose I/O interface 1812 interfaces with a keyboard and/or mouse 1814 as well as an optional touch screen panel 1816 on or separate from display 1810. General purpose I/O interface also connects to a variety of peripherals 1818 including printers and scanners, such as an OfficeJet® or DeskJet® from Hewlett Packard®.

The general purpose storage controller 1820 connects the storage medium disk 1804 with communication bus 1822, which may be an ISA, EISA, VESA, PCI, or similar, for interconnecting all of the components of the computer 1826. A description of the general features and functionality of the display 1810, keyboard and/or mouse 1814, as well as the display controller 1808, storage controller 1820, network controller 1806, and general purpose I/O interface 1812 is omitted herein for brevity as these features are known.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A wireless communication network system, comprising:
a central server (S);
a plurality of cellular base stations (BSs);
a plurality of edge computing devices (Es) in communication with sets of one or more BSs; and
a plurality of client devices (Cs) in communication with one or more BSs,
wherein the client devices (Cs) are configured to send uplink pilot sequences, which are collected and aggregated by the BSs to provide aggregated pilot data,
wherein the plurality of BSs predict beamforming vectors based on the aggregated pilot data,
wherein the central server is configured with a global deep learning (DL) neural network model for prediction of optimal beamforming vectors,
wherein the central server deploys network weights for the global deep learning (DL) neural network model to the plurality of Es for incorporation into a respective plurality of local DL models,
wherein, during training the central server integrates adaptive noise into network weights received for each of the plurality of local DL models,
wherein Es associated with BSs are configured to aggregate channel state information (CSI) from the client devices to train initial local DL models, and the central server(S) is configured to coordinate the DL model training across the edge computing devices using federated learning, and
wherein an objective of the local DL model training is to maximize an achievable rate of communication, wherein each edge computing device calculates a rate function for an achievable throughput based on parameters including Signal-to-Noise Ratio (SNR), channel coefficients between client devices and BSs, and subcarriers.

2. The system of claim 1, wherein the plurality of client devices are configured to transmit omni-transmitted pilot signals,
wherein the plurality of edge computing devices trains respective local DL models by harnessing the omni-transmitted pilot signals to learn and predict optimal RF beamforming vectors for environment and system parameters.

3. The system of claim 1, wherein as updated weights of a local DL model are collected in the central server, the central server computes a maximum absolute weight value, and determines sensitivity based on the maximum absolute weight value and a specified threshold, the sensitivity is the maximum absolute weight value when none of the weights exceed the threshold.

4. The system of claim 3, wherein the central server clips the sensitivity at a threshold linked to a differential privacy budget to maintain privacy.

5. The system of claim 3, wherein the central server incorporates the adaptive noise by calculating a noise scale for updates of each of the plurality of local DL models based on the sensitivity to satisfy a privacy budget, generating noise samples using the noise scale from a Gaussian distribution and appending the noise samples to a noise list, averaging the noise samples in the noise list to obtain a noise average, and transforming the average noise value using a sigmoid function to create an adaptive noise factor.

6. A method of federated learning in a wireless communication network system comprising a plurality of cellular base stations (BSs), a plurality of processing circuitry devices in communication with sets of one or more BSs, and a plurality of client devices (Cs) in communication with one or more BSs, the method comprising:
sending, by the client devices (Cs) and the base stations (BSs), communication beamforming data between the BSs and the Cs;
collecting and aggregating, by the plurality of processing circuitry devices, the communication beamforming data into aggregated communication beamforming data for communication between particular ones of the client devices (Cs) and the base stations (BSs);
training, by each of the plurality of processing circuitry devices, a plurality of local deep learning (DL) models using the aggregated communication beamforming data;
sharing updated weights of the plurality of local DL models with a central server;
integrating, by the central server, adoptive noise into updated weights for each of the local DL models to obtain respective local model noisy weights;
aggregating, by the central server, the respective local model noisy weights to enhance weights for a global deep learning (DL) neural network model;
deploying, by the central server, the enhanced weights for the global deep learning (DL) neural network model to the plurality of processing circuitry devices for incorporation into respective local DL models, wherein the global deep learning (DL) neural network model is configured to predict optimal beamforming vectors;
aggregating, by each of the plurality of processing circuitry devices, channel state information (CSI) from the client devices to train respective initial local DL models;
coordinating, by the central server, the DL model training across the plurality of processing circuitry devices; and
calculating, by the processing circuitry, a rate function for an achievable throughput based on Signal-to-Noise Ratio (SNR), channel coefficients between client devices and BSs, and subcarriers,
wherein an objective of the local DL model training is to maximize an achievable rate of communication.

7. The method of claim 6, further comprising:

transmitting, by the plurality of client devices, omni-transmitted pilot signals; and training, by the plurality of processing circuitry devices, the respective local DL models by harnessing the pilot signals to learn and predict optimal RF beamforming vectors for environment and system parameters.

8. The method of claim 6, further comprising:

as updated weights of a local DL model are collected in the central server, computing a maximum absolute weight value; and determining, by the central server, sensitivity based on the maximum absolute weight value and a specified threshold, the sensitivity is the maximum absolute weight value when none of the weights exceed the threshold.

9. The method of claim 8, further comprising clipping, by the central server, the sensitivity at a threshold linked to a differential privacy budget to maintain privacy.

10. The method of claim 8, wherein the central server incorporates the adaptive noise by calculating a noise scale for updated weights of each of the plurality of local DL models based on the sensitivity to satisfy a privacy budget;

appending noise samples generated using the noise scale from a Gaussian distribution to a noise list;

averaging the noise in the noise list to obtain a noise average; and transforming the average noise value using a sigmoid function to create an adaptive noise factor.

11. A non-transitory computer-readable storage medium including computer executable instructions, wherein the instructions, when executed by a plurality of processing circuitry devices, cause the processing circuitry devices to perform a method of federated learning in a wireless communication network system, comprising a plurality of cellular base stations (BSs), the processing circuitry devices in communication with sets of one or more BSs, and a plurality of client devices (Cs) in communication with one or more BSs, the method comprising:

sending, by the client devices (Cs) and the base stations (BSs), communication beamforming data between the BSs and the Cs;

collecting and aggregating, by the plurality of processing circuitry devices, the communication beamforming data into aggregated communication beamforming data for communication between particular ones of the client devices (Cs) and the base stations (BSs);

training, by each of the plurality of processing circuitry devices, a plurality of local deep learning (DL) models using the aggregated communication beamforming data;

sharing updated weights of the plurality of local DL models with a central processing circuitry device;

integrating, by the central processing circuitry device, adaptive noise into updated weights for each of the local DL models to obtain respective local model noisy weights;

aggregating, by the central processing circuitry device, the respective local model noisy weights to enhance weights for a global deep learning (DL) neural network model; and deploying, by the central processing circuitry device, the enhanced weights for the global deep learning (DL) neural network model to the plurality of processing circuitry devices for incorporation into respective local DL models, wherein the global deep learning (DL) neural network model is configured to predict optimal beamforming vectors, aggregating, by each of the plurality of processing circuitry devices, channel state information (CSI) from the client devices to train respective initial local DL models;

coordinating, by the central processing circuitry device, the DL model training across the plurality of processing circuitry devices;

computing a maximum absolute weight value as updated weights of a local DL model are collected in the central processing circuitry device; and determining, by the central processing circuitry device, sensitivity based on the maximum absolute weight value and a specified threshold, the sensitivity is the maximum absolute weight value when none of the weights exceed the threshold;

wherein the central processing circuitry device incorporates the adaptive noise by calculating a noise scale for updated weights of each of the plurality of local DL models based on the sensitivity to satisfy a privacy budget;

appending noise samples generated using the noise scale from a Gaussian distribution to a noise list;

averaging the noise in the noise list to obtain a noise average; and transforming the average noise value using a sigmoid function to create an adaptive noise factor.

12. The non-transitory computer-readable storage medium of claim 11, further comprising:

transmitting, by the plurality of client devices, omni-transmitted pilot signals; and training, by the plurality of processing circuitry devices, the respective local DL models by harnessing the pilot signals to learn and predict optimal RF beamforming vectors for environment and system parameters.

13. The non-transitory computer-readable storage medium of claim 11, further comprising clipping, by the central processing circuitry device, the sensitivity at a threshold linked to a differential privacy budget to maintain privacy.

* * * * *